US012625510B2

(12) United States Patent
Sedghi et al.

(10) Patent No.: US 12,625,510 B2
(45) Date of Patent: May 12, 2026

(54) METHODS AND DEVICES FOR DYNAMIC PORE NETWORK MODELING OF TWO-PHASE FLOW IN MIXED-WET POROUS MEDIA

(71) Applicant: UNIVERSITY OF WYOMING, Laramie, WY (US)

(72) Inventors: Mohammad Sedghi, Laramie, WY (US); Yanbin Gong, Laramie, WY (US); Mohammad Piri, Laramie, WY (US)

(73) Assignee: UNIVERSITY OF WYOMING, Laramie, WY (US)

( * ) Notice: Subject to any disclaimer, the term of this patent is extended or adjusted under 35 U.S.C. 154(b) by 331 days.

(21) Appl. No.: 18/239,493

(22) Filed: Aug. 29, 2023

(65) Prior Publication Data

US 2024/0069577 A1     Feb. 29, 2024

Related U.S. Application Data

(60) Provisional application No. 63/402,002, filed on Aug. 29, 2022.

(51) Int. Cl.
*G01N 15/08*      (2006.01)
*G01N 33/24*      (2006.01)
*G05D 7/06*       (2006.01)

(52) U.S. Cl.
CPC ........... *G05D 7/0617* (2013.01); *G01N 15/08* (2013.01)

(58) Field of Classification Search
CPC ......... G01N 33/24; G05D 7/06; G05D 7/0617
See application file for complete search history.

(56) References Cited

U.S. PATENT DOCUMENTS 9,183,326  B2 *  11/2015  de Prisco ................ G06F 30/20
10,114,864  B1    10/2018  Torun
(Continued)

FOREIGN PATENT DOCUMENTS

CN        112329358  A     2/2021
GB          2417787  A  *  3/2006  ............. G01N 33/24

OTHER PUBLICATIONS

Hazlett, Simulation of capillary-dominated displacements in microtomographic images of reservoir rocks, Transport in Porous Media, 20:21-35, Aug. 1995, 15 pages.
(Continued)

*Primary Examiner* — Nguyen Q. Ha
(74) *Attorney, Agent, or Firm* — Patterson + Sheridan, LLP

(57)     ABSTRACT

A method and system for predicting dynamic two-phase fluid flow in a mixed-wet porous medium by one or more central processing units (CPUs), comprising generating a set of movements of main terminal menisci (MTMs) of a two-phase fluid within a pore network model (PNM) of a porous media sample having a set of pore elements; by generating a pressure field for each of the set of movements of MTMs based on at least an inlet capillary pressure or a set of flow injection boundary conditions; identifying a set of local capillary pressures and a set of arc meniscus (AM) locations based on the pressure field; identifying a set of fluid displacement potentials based on at least the set of local capillary pressures and a set of threshold capillary pressures; and identifying a highest positive fluid displacement potential from a set of fluid displacements.

20 Claims, 10 Drawing Sheets

(56)                    References Cited

U.S. PATENT DOCUMENTS

| | | |
|---|---|---|
| 2004/0204857 A1 | 10/2004 | Ramamoorthy et al. |
| 2008/0208539 A1 | 8/2008 | Lee et al. |
| 2013/0259190 A1 | 10/2013 | Walls et al. |
| 2014/0019054 A1 | 1/2014 | De Prisco et al. |
| 2015/0104078 A1 | 4/2015 | Varslot et al. |
| 2015/0374028 A1 | 12/2015 | Gindrat et al. |
| 2018/0121579 A1 | 5/2018 | Fredrich et al. |
| 2018/0253514 A1 | 9/2018 | Bryant et al. |
| 2018/0321127 A1 | 11/2018 | León Carrera et al. |
| 2019/0154597 A1 | 5/2019 | Zhang |
| 2020/0110849 A1 | 4/2020 | Rabbani et al. |
| 2020/0309667 A1 | 10/2020 | Nie et al. |
| 2021/0208051 A1 | 7/2021 | Ju et al. |
| 2023/0407743 A1 | 12/2023 | Shoukry et al. |
| 2024/0070356 A1 | 2/2024 | Mccaskill et al. |
| 2024/0070357 A1 | 2/2024 | Mccaskill et al. |

OTHER PUBLICATIONS

Elrich, Viscous coupling in two-phase flow in porous media and its effect on relative permeabilities, Transport in Porous Media 11, Apr. 9, 1992, 18 pages.

Rabbani et al, Hybrid pore-network and lattice-boltzmann permeability modelling accelerated by machine learning, Advances in water resources 126, Feb. 26, 2019, 13 pages.

Rabbani, et al., An automated simple algorithm for realistic pore network extraction from micro-tomography images, J Pet Sci Eng, vol. 123, Aug. 12, 2014, 8 pages.

Raeesi et al., Capillary pressure hysteresis behavior of three sandstones measured with a multistep outflow-inflow apparatus, Vadose Zone Journal 13, Jun. 1, 2013, 12 pages.

Raeesi et al., The effects of wettability and trapping on relationships between interfacial area, capillary pressure and saturation in porous media: A pore-scale network modeling approach, Journal of Hydrology 376, 2009, 16 pages.

Raeesi, et al., Effect of surface roughness on wettability and displacement curvature in tubes of uniform cross-section. Colloids and Surfaces A: Physicochemical and Engineering Aspects 436, 2013, 10 pages.

Raeini, et al., Generalized network modeling: Network extraction as a coarse-scale discretization of the void space of porous media, Phys. Rev. E, 96 (2017), 17 pages.

Raeini, et al., Modelling two-phase flow in porous media at the pore scale using the volume-of-fluid method. Journal of Computational Physics 231, 2012, 16 pages.

Rücker et al., Relationship between wetting and capillary pressure in a crude oil/brine/rock system: From nano-scale to core-scale, Journal of Colloid and Interface Science 562, Nov. 21, 2019, 11 pages.

Ruspini, et al., Multiscale digital rock analysis for complex rocks. Transport in Porous Media, 139(2), Aug. 26, 2021, 26 pages.

Sabti, et al., In-situ investigation of the impact of spreading on matrix-fracture interactions during three-phase flow in fractured porous media. Advances in Water Resources 131, 2019, 15 pages.

Saraji, et al., Wettability of Supercritica lCarbon Dioxide/Water/Quartz Systems: Simultaneous measurement of Contact Angle and Interfacial Tension at Reservoir Conditions, Langmuir ACS Publications, Apr. 29, 2013, 11 pages.

Scanziani et. al., Automatic method for estimation of in situ effective contact angle from x-ray micro tomography images of two-phase flow in porous media, Journal of Colloid and Interface Science 496, 2017, 9 pages.

Sedghi, et al., Atomistic Molecular Dynamics Simulations of Crude Oil/Brine Displacement in Calcite Mesopores, Langmuir, ACS Publications, Mar. 24, 2016, 10 pages.

Sedghi, et al., Molecular dynamics of wetting layer formation and forced water invasion in angular nanopores with mixed wettability, The Journal of Chemical Physics, Nov. 19, 2014, 13 pages.

Sendner et al, Interfacial Water at Hydrophobic and Hydrophilic Surfaces: Slip, Viscosity, and Diffusion. Langmuir 25, 10768-10781, Jun. 11, 2009, 14 pages.

Shabat et al., Design of porous micro-structures using curvature analysis for additive-manufacturing, Eslevier, Procedia CIRP 36, 2015, 6 pages.

Sheng, et al., A unified pore-network algorithm for dynamic two-phase flow, Advances in Water Resources 95, 2016, 17 pages.

Shi et al, Relative permeability of two-phase flow in three-dimensional porous media using the lattice Boltzmann method, International Journal of Heat and Fluid Flow 73, Aug. 4, 2018, 13 pages.

Silin et al., Pore space morphology analysis using maximal inscribed spheres, Physica A, May 16, 2006, 25 pages.

Singh et al, Dynamic modeling of drainage through three-dimensional porous materials, Chemical Engineering Science 58, Apr. 2003, 18 pages.

Siqveland et al, Derivations of the young-laplace equation, Capillarity vol. 4 No. 2, 2021, 8 pages.

Spanne et al, Synchrotron computed microtomography of porous media: topology and transports, Physical Review Letters, Oct. 3, 1994, 16 pages.

Suicmez, et al., Effects of wettability and pore-level displacement on hydrocarbon trapping, Advances in Water Resources, Nov. 19, 2007, 10 pages.

Suicmez, et al., Pore-scale Simulation of Water Alternate Gas Injection, Transport in Porous Media 66:259-286, Springer, 31, Jan. 2006, 28 pages.

Lee et al, Building skeleton models via 3-d medial surface axis thinning algorithms, CVGIP: Graphical Models and Image Processing, 56, Nov. 1994, 17 pages.

Tan et al. Equation-of-State Modeling of Associating-Fluid Phase Equilibria in Nanopores, Fluid Phase Equilibria 405, 2015, 10 pages.

Tan et al., Equation-of-State Modeling of Confined-Fluid Phase Equilibria in Nanopores, Fluid Phase Equilibria 393, 2015, 16 pages.

Thompson, Pore-scale modeling of fluid transport in disordered fibrous materials, AIChE Journal, Jul. 2002, vol. 48, No. 7, 21 pages.

Tokunaga et al, Water film flow along fracture surfaces of porous rock, Water Resources Research vol. 33 No. 6, Jun. 1997, 9 pages.

Tokunaga et. al., Transient film flow on rough fracture surfaces, Water Resources Research vol. 36 No. 7, Jun. 2000, 10 pages.

Tørå et al., A Dynamic Network Model for Two-Phase Flow in Porous Media. Transp Porous Med 92, 2012, 21 pages.

Tsang, et. al., Hydrologic issues associated with nuclear waste repositories, Water Resources Research 51, 2015, 50 pages.

Valvatne, et al., Predictive pore-scale modeling of two-phase flow in mixed wet media. Water Resources Research 40, 2004, 21 pages.

Van Genuchten, A closed-form equation for predicting the hydraulic conductivity of unsaturated soils, Soil Sci. Soc. Am. J. vol. 44, 1980, 7 pages.

Van Gorp et al, Bottom-up design of porous electrode by combining a genetic algorithm and a pore network model, Chemical Engineering Journal 455, 2023 13 pages.

Virnovsky, et al., Modeling capillary pressure using capillary bundles with arbitrary cross-sections obtained from photomicrographs. Journal of Petroleum Science and Engineering 69, 2009, 12 pages.

Vouga, Lectures In Discrete Differential Geometry 3-Discrete Surfaces, Mar. 19, 2014, 6 pages.

Wang et al., Connecting pressure-saturation and relative permeability models to fracture properties: The case of capillary-dominated flow of supercritical CO2 and brine, Water Resources Research, Sep. 27, 2018, 18 pages.

Wang et. al., Experimental study of the nonlinear flow characteristics of fluid in 3d rough-walled fractures during shear process, Rock Mechanics and Rock Engineering, Feb. 25, 2020, 25 pages.

Wang, et al., A dynamic pore-scale network model for two-phase imbibition, Journal of Natural Gas Science and Engineering 26, 2015, 12 pages.

Wang, et al., Deep learning in pore scale imaging and modeling. Earth-Science Reviews, 215, 2021, 32 pages.

(56)                    References Cited

OTHER PUBLICATIONS

Wang, et al., Fast direct flow simulation in porous media by coupling with pore network and Laplace models. Advances in Water Resources 150, 103883, 2021, 13 pages.

Watanabe et. al., New v-type relative permeability curves for two-phase flows through subsurface fractures, Water Resources Research, Apr. 26, 2015, 18 pages.

Welch et al., Molecular Dynamics Simulations of Retrograde Condensation in Narrow Oil-Wet Nanopores, The Journal of Physical Chemistry, 2015, 8 pages.

Welch et al., Pore diameter effects on phase behavior of a gas condensate in graphitic one- and two-dimensional nanopores, J Mol Model, 2016, 9 pages.

Wildenschild, et al., X-ray imaging and analysis techniques for quantifying pore-scale structure and processes in subsurface porous medium systems, Advanced Water Resources, vol. 51, Jan. 2013, 75 pages.

Xie, et al., Impact of connate brine chemistry on in situ wettability and oil recovery: Pore-scale experimental investigation, Energy &fuels, 2020, 15 pages.

Frette, et al., A semi-analytical model for computation of capillary entry pressures and fluid configurations in uniformly-wet pore spaces from 2d rock images. Advances in Water Resources 33, May 11, 2010, 21 pages.

Garing et al., Pore-scale capillary pressure analysis using multiscale x-ray micromotography, https://www.sciencedirect.com/science/article/pii/S0309170816305437, 2017, 38 pages.

Gesho, et al., Pore Network Extraction Algorithm and Geometrical Upscaling—Theoretical Description, Water Resource Research, Jun. 1, 2016, 39 pages.

Gjennestad, et al., Stable and Efficient Time Integration of a Dynamic Pore Network Model for Two-Phase Flow in Porous Media. Frontiers in Physics. Jun. 13, 2018, 16 pages.

Glass et. al., A modified invasion percolation model for low-capillary number immiscible displacements in horizontal rough-walled fractures: Influence of local in-plane curvature, Water Resources Research, vol. 34, No. 12, Dec. 1998, 20 pages.

Gong et. al., Dynamic pore-scale modeling of residual fluid configurations in disordered porous media, E3S Web of Conferences 366, 2013, https://doi.org/10.1051/e3sconf/202336601018, 13 pages.

Gong et. al., Dynamic pore-scale modeling of residual trapping in a rough-walled fracture, Transport in Porous Media, 140, May 11, 2021, 38 pages.

Gong et. al., Parallel dynamic pore-network modeling package for two-phase flow in fractures and solute transport in disordered porous media and rough-walled fractures, Dissertation, Jun. 23, 2001, 245 pages.

Gong, et al., Dynamic Pore-Scale Modeling of Residual Trapping Following Imbibition in a Rough-walled Fracture, Transport in Porous Media 140, May 11, 2021, 37 pages.

Gong, et al., Pore-to-Core Upscaling of Solute Transport Under Steady-State Two-Phase Flow Conditions Using Dynamic Pore Network Modeling Approach, Transport in Porous Media 135, Sep. 15, 2020, 38 pages.

Gong, et al., Two-Phase Relative Permeability of Rough-Walled Fractures: A Dynamic Pore-Scale Modeling of the Effects of Aperture Geometry, Water Resources Research, Nov. 18, 2021, 38 pages.

Gong, Dynamic pore network modeling of two-phase flow and solute transport in disordered porous media and rough-walled fractures, Dissertation, Dept of Petroleum Engineering, Aug. 2021, 245 pages.

Goodfellow, et al., Generative adversarial nets. Advances in Neural Information Processing Systems, https://www.github/com/goodfeli/adversarial, 9 pages, (Year: 2013).

Gostick, Versatile and efficient pore network extraction method using marker-based watershed segmentation, Phys Rev E, vol. 96, Aug. 16, 2017, 15 pages.

Guo et. al., Thermal drawdown-induced flow channelling in a single fracture in EGS, Geothermics 61, Jan. 28, 2016, 17 pages.

Hammond, et al., A Dynamic Pore Network Model for Oil Displacement by Wettability-Altering Surfactant Solution. Transp Porous Med 92, Jan. 10, 2012, 30 pages.

Hart et al, A Formal Basis for the Heuristic Determination of Minimum Cost Paths, IEEE Transactions on Systems Science and Cybernetics, vol. 4, No. 2, Jul. 1968, 8 pages.

Hassanizadeh et al, Thermodynamic basis of capillary pressure in porous media, Water resources research, Oct. 1993, 17 pages.

Hassler et al., Measurement of Capillary Pressures in Small Core Samples, Los Angeles Meeting Oct. 1944, 10 pages.

Helland et al, Characterization of pore shapes for pore network models, Proceedings of the 11th European Conference on the Mathematics of Oil Recovery (ECMOR XI), Sep. 2008, 13 pages.

Helland et al, Computation of fluid configurations and capillary pressures in mixed-wet 2d pore spaces from rock images, Proceedings of the XVIII International Conference on Water Resources, Jun. 2010, 12 pages.

Herring et al., Flow rate impacts on capillary pressure and interface curvature of connected and disconnected fluid phases during multiphase flow in sandstone, Advances in Water Resources 107, 2017, 10 pages.

Honarpour et al, Relative-permeability measurements: An overview, SPE Technology Today Series, Aug. 1988,4 pages.

Huang et al, Water Slippage versus Contact Angle: A Quasiuniversal Relationship. Phys. Rev. Lett. 101 226101, Nov. 28, 2008, 4 pages.

Hughes et al, Network modeling of multiphase flow in fractures, Advances in Water Resources 24, 2001, 13 pages.

Hughes et al, Pore Scale Modeling of Rate Effects in Imbibition, Transport in Porous Media 40, 2000, 29 pages.

Hui et al, Effects of wettability on three-phase flow in porous media, The Journal of Physical Chemistry B 104, Feb. 17, 2000, 13 pages.

Huo et al, Experimental investigation of stress-dependency of relative permeability in rock fractures, Transp Porous Med 113, 2016, 25 pages.

Ibekwe et al, Automated extraction of in situ contact angles from micro-computed tomography images of porous media, Computers and Geosciences 137, Feb. 3, 2020, 12 pages.

Idowu, et al., Pore-Scale Modelling of Rate Effects in Waterflooding. Transport in Porous Media 83, 2010, 20 pages.

Joekar-Niasar et. al., Insights into the relationships among capillary pressure, saturation, interfacial area and relative permeability using pore-network modeling, Transp Porous Med 74, 2008, 20 pages.

Kang et al, Lattice Boltzmann pore-scale model for multicomponent reactive transport in porous media, Journal of Geophysical Research: Solid Earth 111, 2006, 12 pages.

Kang et al, Minimized Capillary End Effect During CO2 Displacement in 2-D Micromodel by Manipulating Capillary Pressure at the Outlet Boundary in Lattice Boltzmann Method, Water Resources Research 54, 2018, 21 pages.

Karpyn et. al., Visualization of fluid occupancy in a rough fracture using micro-tomography, Journal of Colloid and Interface Science 307, 2007, 7 pages.

Karpyn, et al., Prediction of fluid occupancy in fractures using network modeling and x-ray microtomography. I: Data conditioning and model description, Physical Review E 76, 016315, Jul. 31, 2007, 13 pages.

Karypis et al, A fast and high quality multilevel scheme for partitioning irregular graphs, Society for Industrial and Applied Mathematics Journal vol. 20 No. 1, 1998, 35 pages.

Keller et. al., Behavior of nonaqueous phase liquids in fractured porous media under two-phase flow conditions, Transport in Porous Media 38, 2000, 16 pages.

Khishvand, et al., An Improved Insight into Low-Salinity Waterflooding: In-Situ Characterization of Wettability Alteration at Elevated Pressure and Temperature Conditions, SCA2016_Temp032, Aug. 2016, 12 pages.

Khishvand, et al., In situ characterization of wettability alteration and displacement mechanisms governing recovery enhancement due to low-salinity waterflooding. Water Resources Research 53, May 31, 2017, 17 pages.

(56) References Cited

OTHER PUBLICATIONS

Khishvand, et al., In-situ Characterization of Wettability and Pore-scale Displacements during Two- and Three-phase flow in Natural Porous Media, Department of Petroleum Engineering, 2016, 52 pages.

Khishvand, et al., Micro-scale experimental investigation of the effect of flow rate on trapping in sandstone and carbonate rock samples. Advances in Water Resources 94, May 20, 2016, 21 pages.

Klise et. al., Automated contact angle estimation for three-dimensional x-ray microtomography data, https://www.scienedirect.com/science/article/pii/S030917815002651, 2015, 14 pages.

Kohanpur, et al., Pore-Network Stitching Method: A Pore-to-Core Upscaling Approach for Multiphase Flow. Transport in Porous Media, Oct. 27, 2020, 28 pages.

Kuang, et al., Pore-Scale Sweep Efficiency Enhancement by Silica-Based Nanofluids in Oil-Wet Sandstone, Energy Fuels 2020, 12 pages.

Lago et al, Threshold pressure in capillaries with polygonal cross section, Journal of colloid and interface science 243, 2001, 8 pages.

Lanetc et al, Coupling of transient matrix diffusion and pore network models for gas flow in coal, Journal of Natural Gas Science and Engineering 88, 2021, 12 pages.

Laubach et. al., Are open fractures necessarily aligned with maximum horizontal stress, Earth and Planetary Science Letters 222, Feb. 17, 2004, 5 pages.

Ledig, et al., Photo-realistic single image super-resolution using a generative adversarial network., IEEE Conference on Computer Vision and Pattern Recognition, May 25, 2017, 19 pages.

Lemonnier et al, Simulation of naturally fractured reservoirs. State of the art-part 1-physical mechanisms and simulator formulation, Oil & Gas Science and Technology—Rev. IFP vol. 65, 2010, 24 pages.

Leverett, et al., Capillary Behavior in Porous Solids, manuscript, Oct. 1940, 18 pages.

Li et. al., An improved method for estimating capillary pressure from 3d microtomography images and its application to the study of disconnected nonwetting phase, Science Direct, 2018, 33 pages.

Lian et. al., The characteristics of relative permeability curves in naturally fractured carbonate reservoirs, Journal of Canadian Petroleum Technology, Mar. 2012, 6 pages.

Liang, et al., Geometric and topological analysis of three-dimensional porous media: Pore space partitioning based on morphological skeletonization, Journal of Colloid and Interface Science, 221, 2000, 12 pages.

Lim et al., Enhanced deep residual networks for single image super-resolution, In Proceedings of the IEEE conference on computer vision and pattern recognition workshops, Jul. 10, 2017, 9 pages.

Lin et al., Imaging and measurement of pore-scale interfacial curvature to determine capillary pressure simultaneously with relative permeability, Water Resources Research 54, Sep. 8, 2018, 15 pages.

Lin et. al., Minimal surfaces in porous media: Pore-scale imaging of multiphase flow in an altered-wettability Bentheimer sandstone, Physical Review E 99, Jun. 10, 2019, 13 pages.

Lindquist et al., Investigating 3D geometry of porous media from high resolution images, Physics and Chemistry of the Earth, MS No. SE39.2012, 1998, 8 pages.

Lindquist, et al., Medial Axis Analysis of Three Dimensional Tomographic Images of Drill Core Samples, Jan. 27, 1995, 19 pages.

Lindquist, The geometry of primary drainage, Journal of colloid and interface science 296, Nov. 16, 2005, 14 pages.

Lorensen et al., Marching cubes: A high resolution 3d surface construction algorithm, Computer Graphics, vol. 21, No. 4, Jul. 1987, 8 pages.

Lv et. al., In situ local contact angle measurement in a CO2-brine-sand system using microfocused x-ray CT, Research Gate, Jan. 19, 2018, 10 pages.

Heshmati et al, Experimental investigation of dynamic contact angle and capillary rise in tubes with circular and noncircular cross sections, Langmuir, Oct. 16, 2014, 12 pages.

Ma, et al., Effect of contact angle on drainage and imbibition in regular polygonal tubes, Colloids and Surfaces A: Physicochemical and Engineering Aspects 117, 1996, 19 pages.

Maini et. al., A comparison of steady-state and unsteady-state relative permeabilities of viscocities oil and water in Ottawa sand, The Journal of Canadian Petroleum Technology, Mar.-Apr. 1990, 7 pages.

March et. al., Assessment of CO2 storage potential in naturally fractured reservoirs with dual-porosity models, Water Resources Research 54, Mar. 8, 2018, 20 pages.

Mascini, et al., Event-based contact angle measurements inside porous media using time-resolved micro-computed tomography, Journal of Colloid and Interface Science 572, 2020, 10 pages.

Mason et al., Capillary behavior of a perfectly wetting liquid in irregular triangular tubes, Journal of Colloid and Interface Science, vol. 141, No. 1, Jan. 1991, 13 pages.

Masson, A fast two-step algorithm for invasion percolation with trapping, Computers & Geosciences 90, Feb. 3, 2016, 9 pages.

Mayer et al., Mercury porosimetry—breakthrough pressure for penetration between packed spheres, Journal of Colloid Science 20, Mar. 4, 1965, 19 pages.

Miao et al., A new way to parameterize hydraulic conductances of pore elements: A step towards creating pore-networks without pore shape simplifications, Advances in water resources 105, Apr. 26, 2017, 11 pages.

Mirani et. al., Production-pressure-drawdown management for fractured horizontal wells in shale-gas formations, SPE Reservoir Evaluation & Engineering, Aug. 2018, 16 pages.

Mohamed, et al., A pore-scale experimental investigation of process-dependent capillary desaturation, Advances in Water Resources 114, 2020, 13 pages.

Neuweiler et. al., Experimental and theoretical investigations of drainage in horizontal rough-walled fractures with different correlation structures, Advances in Water Resources 27, Jul. 14, 2004, 15 pages.

Nguyen et. al., Effectiveness of supercritical-CO2 and N2 huff-and-puff methods of enhanced oil recovery in shale fracture networks using microfluidic experiments, Science Direct, 2018, 39 pages.

Oak, Three-Phase Relative Permeability of Water-Wet Berea, SPE/DOE 20183, Apr. 25, 1990, 12 pages.

Ogilvie et. al., Fluid flow through rough fractures in rocks. II: A new matching model for rough rock fractures, Earth and Planetary Science Letters 241, Jan. 4, 2006, 12 pages.

Øren et al, Extending predictive capabilities to network models, SPE journal 3, Jun. 15, 1996, 18 pages.

Øren et al, Reconstruction of Berea sandstone and pore-scale modelling of wettability effects, J Pet Sci Eng, vol. 39, No. 3-4, Jan. 24, 2003, 24 pages.

Ovaysi et al., Multi-GPU acceleration of direct pore-scale modeling of fluid flow in natural porous media, Computer Physics Communications, Apr. 25, 2012, 9 pages.

Ovaysi et al., Pore-scale dissolution of CO2+SO2 in deep saline aquifers, International Journal of Greenhouse Gas Control, Mar. 18, 2013, 15 pages.

Ovaysi et al., Pore-space alteration induced by brine acidification in subsurface geologic formations, Water Resources Research, vol. 50, 440-452, Jan. 17, 2014.

Ovaysi, et al., Direct pore-level modeling of incompressible fluid flow in porous media, Journal of Computational Physics, Jun. 23, 2010, 21 pages.

Ovaysi, et al., Pore-scale modeling of dispersion in disordered porous media, Journal of Contaminant Hydrology, Feb. 15, 2011, 14 pages.

Patzek, Verification of a Complete Pore Network Simulator of Drainage and Imbibition, SPE J. 6, Jan. 10, 2001, 13 pages.

Persoff et al, Two-phase flow visualization and relative permeability measurement in natural rough-walled rock fractures, Water Resources Research vol. 31, May 1995, 12 pages.

Petchsingto, Numerical study of fracture aperture characteristics and their impact on single-phase flow and capillary-dominated

(56) References Cited

OTHER PUBLICATIONS displacement, The Pennsylvania State University College of Earth and Mineral Sciences, May 2008, 153 pages.

Piri et al, Prediction of fluid occupancy in fractures using network modeling and x-ray microtomography. II: Results, Physical Review E 76, 2007, 11 pages.

Piri et al, Three-phase threshold capillary pressures in noncircular capillary tubes with different wettabilities including contact angle hysteresis, Physical Review E 70, Dec. 14, 2004, 17 pages.

Piri et al., "Three-dimensional mixed-wet random pore-scale network modeling of two- and three-phase flow in porous media. I. Model description", Physical Review E 71, 026301, 2005, 30 pages.

Piri, et al., Three-dimensional mixed-wet random pore-scale network modeling of two- and three-phase flow in porous media. II. Results, Physical Review E 71, 026301, Feb. 4, 2005, 11 pages.

Princen, Capillary Phenomena In Assemblies Of Parallel Cylinders: I. Capillary Rise Between Two Cylinders, Journal of Colloid and Interface Science, 30, 1969, 7 pages.

Princen, Capillary Phenomena In Assemblies Of Parallel Cylinders: II. Capillary Rise In Systems With More Than Two Cylinders. Journal of Colloid and Interface Science, 30, 1969, 13 pages.

Princen, Capillary Phenomena In Assemblies Of Parallel Cylinders: III. Liquid cols. Between Horizontal Parallel Cylinders. Journal of Colloid and Interface Science, 34, 1970, 14 pages.

Prodanovic et al., A level set method for determining critical curvatures for drainage and imbibition, Elsevier, Journal of Colloid and Interface Science 304, Aug. 23, 2006, 17 pages.

Prodanovic et al., Porous structure and fluid partitioning in poly-ethylene cores from 3D x-ray microtomographic imaging, Journal of Colloid and Interface Science, 298 (2006), 16 pages.

Prodanovic, et al., 3d image-based characterization of fluid displacement in a berea core. Advances in Water Resources, 30, 2007, 13 pages.

Prodanovic, et al., Imaged-based multiscale network modelling of microporosity in carbonates, Geological Society, 406 (2015), 19 pages.

Pruess, et al., On two-phase relative permeability and capillary pressure of rough-walled rock fractures, Earth Sciences Division, Sep. 1989, 44 pages.

Purcell, Capillary Pressures—Their Measurement Using Mercury and the Calculation of Permeability Therefrom, Shell Oil Company, Petroleum Transactions, AIME, Feb. 1949, 10 pages.

Adler, Transports in fractal porous media, Journal of Hydrology, 187 (1996), 19 pages.

Aghaei, et al., Direct pore-to-core up-scaling of displacement processes: Dynamic pore network modeling and experimentation, Journal of Hydrology 522 2015, 22 pages.

Akai et. al., Quantification of uncertainty and best practice in computing interfacial curvature from complex pore space images, Dept of Earth Sci. & Eng, Jul. 3, 2019, 21 pages.

Aker, et al., A Two-Dimensional Network Simulator for Two-Phase Flow in Porous Media, Transport in Porous Media 32, 1998, pp. 163-186.

Al-Gharbi, et al., Dynamic network modeling of two-phase drainage in porous media. Phys. Rev. E 71, 16308, Jan. 13, 2005, 16 pages.

Alhammadi et. al., Pore-scale x-ray imaging with measurement of relative permeability, capillary pressure and oil recovery in a mixed-wet micro-porous carbonate reservoir rock, Fuel 268, Feb. 29, 2020, 14 pages.

Alizadeh, et al., The effect of saturation history on three-phaserelative permeability: An experimental study, Department of Chemical and Petroleum Eng, University of Wyoming, Jan. 31, 2014, 29 pages.

Al-Raoush et al., Extraction of physically realistic pore network properties from three-dimensional synchrotron x-ray microtomography images of unconsolidated porous media systems, Journal of Hydrology, 300, 2005, 173 pages.

AlRatrout et. al., Automatic measurement of contact angle in pore-space images, Advances in Water Resources 109, 2017, 12 pages.

Álvaro González, Measurement of areas on a sphere using fibonacci and latitude-longitude lattices. Mathematical Geosciences, 42, Nov. 28, 2009, 17 pages.

An, et al., Transition From Viscous Fingering to Capillary Fingering: Application of GPU-Based Fully Implicit Dynamic Pore Network Modeling, Water Resources Research 56, Oct. 22, 2020, 18 pages.

Anbari et al., Estimation of capillary pressure in unconventional reservoirs using thermodynamic analysis of pore images. JGR: Solid Earth, Nov. 7, 2019, 23 pages.

Anderson, W. G. Wettability Literature Survey—Part 6: The Effects of Wettability on Waterflooding, Journal of Petroleum Technology, Dec. 1987, 18 pages.

Anderson, Wettability Literature Survey—Part 2: Wettability Measurement, Journal of Petroleum Technology, Nov. 1986, 17 pages.

Anderson, Wettability Literature Survey Part 5: The Effects of Wettability on Relative Permeability, Journal of Petroleum Technology, Nov. 1987, 16 pages.

Andrä et al., Digital rock physics benchmarks—part i: Imaging and segmentation, Computers & Geosciences, 50, Sep. 18, 2012, 8 pages.

Andrew, et al., Pore-scale contact angle measurements at reservoir conditions using X-ray microtomography, Advances in Water Resources 68, 2014, 8 pages.

Armstrong, et al., Linking pore-scale interfacial curvature to column scale capillary pressure, Advances in Water Resources 46, 2012, 8 pages.

Arshadi et. al., Pore-Scale Experimental Investigation of Two-Phase Flow Through Fractured Porous Media, Advancing Earth and Space Science, May 20, 2018, 30 pages.

Ayodele, Theoretical analysis of viscous coupling in two-phase flow through porous media, Transport in Porous Media, 2006, 14 pages.

Bakhshian, et al., Pore-scale characteristics of multiphase flow in heterogeneous porous media using the lattice Boltzmann method, Scientific Reports 9 Mar. 4, 2019, 14 pages.

Balay et al, PETSc Users Manual, Technical Report ANL-95/11 Revision 3.11, Argonne National Laboratory, 2019, 268 pages.

Bear, Modeling Flow and Contaminant Transport in Fractured Rocks, Technion-Israel Institute of Technology, 1993, 37 pages.

Berg et. al., Real-time 3D imaging of Haines jumps in porous media flow, Harvard University, Jan. 17, 2023, 5 pages.

Bertels et. al., Measurement of aperture distribution, capillary pressure, relative permeability, and in situ saturation in a rock fracture using computed tomography scanning, Water Resources Research, vol. 37, No. 3, Mar. 2001, 14 pages.

Bhattad et al, Effect of network structure on characterization and flow modeling using x-ray micro-tomography images of granular and fibrous porous media, Transport in Porous Media 90, 2011, 30 pages.

Blunt et. al., A thermodynamically consistent characterization of wettability in porous media using high-resolution imaging, Journal of Colloid and Interface Science 552, 2019, 7 pages.

Blunt, Effects of heterogeneity and wetting on relative permeability using pore level modeling, SPE Journal, vol. 2, Mar. 1997, 18 pages.

Blunt, et al., Pore-scale imaging and modelling, Advances in Water Resources, 51, 2013, https://doi.org/10.1016/j.advwatres.2012.03.003, 20 pages.

Blunt, Physically-based network modeling of multiphase flow in intermediate-wet porous media. Journal of Petroleum Science and Engineering 20, Jan. 21, 1998, 9 pages.

Blunt, et al., Detailed physics, predictive capabilities and macroscopic consequences for pore-network models of multiphase flow, Advances in Water Resources, 25 (2002), 21 pages.

Brown, Fluid flow through rock joints: The effect of surface roughness, Journal of Geophysical Research, vol. 92, No. B2, Feb. 10, 1987, 11 pages.

Brown, Simple mathematical model of a rough fracture, Journal of Geophysical Research, vol. 100, No. B4, Apr. 10, 1995, 12 pages.

(56)            References Cited

OTHER PUBLICATIONS

Brush et al., Fluid flow in synthetic rough-walled fractures: Navier-stokes, stokes, and local cubic law simulations, Water Resources Research, vol. 39, No. 4, 1085, Apr. 3, 2023, 15 pages.

Bryant, et al., Prediction of relative permeability in simple porous media, Phys. Rev. A, vol. 46, No. 4, Aug. 15, 1992, 8 pages.

Bultreys et al, Validation of model predictions of pore-scale fluid distributions during two-phase flow, Phys. Rev. E, 97, May 14, 2018, 14 pages.

Chen, Liquid-gas relative permeabilities in fractures: Effects of flow structures, phase transformation and surface roughness, Dissertation, Jun. 2005, 222 pages.

Corey, et. al., Three-Phase Relative Permeability, Gulf Research & Development Co., Nov. 1956, 3 pages.

Culligan et. al., Interfacial area measurements for unsaturated flow through a porous medium, Water Resources Research, vol. 40, W12413, Dec. 22, 2004, 12 pages.

Culligan et. al., Pore-scale characteristics of multiphase flow in porous media: A comparison of air-water and oil-water experiments, Advances in Water Resources 29, 2006, 12 pages.

David et. al., Investigation of the Neumann triangle for dodecane liquid lenses on waters, Colloids and Surfaces A: Physicochemical and Engineering Aspects, 333, 2009, 7 pages.

Desbrun et. al., Implicit fairing of irregular meshes using diffusion and curvature flow, SIGGRAPH 99, 1999, 8 pages.

Detwiler et. al., Interphase mass transfer in variable aperture fractures: Controlling parameters and proposed constitutive relationships, Water Resources Research, vol. 45, Aug. 27, 2009, 21 pages.

Diomampo, Relative permeability through fractures, SGP-TR-170, Aug. 2001, 74 pages.

Dong, et al., Pore-network extraction from micro-computerized-tomography images, Phys. Rev. E 80, 036307, Sep. 14, 2009, 11 pages.

Dong, Micro-CT Imaging and Pore Network Extraction, Dissertation to Dept. of Earth Science and Engineering of Imperial College London, 2007, 30 pages.

Ehrlich, Viscous Coupling in Two-Phase Flow in Porous Media and Its Effect on Realtive Permeabilities, Transport in Porous Media, 11, 1993, 18 pages.

Fatt, The Network Model of Porous Media. AIME Petroleum Transactions, 1956, 38 pages.

Fei, Avizo Reference Guide, Avizo Software for Materials Research, ThermoFisher, 12 pages, (Year: 2019).

Ferer et. al., Two-phase flow in a rough fracture: Experiment and modeling, Physical Review E84, Jul. 28, 2011, 8 pages.

Xiong, et al., Review of pore network modelling of porous media: Experimental characterisations, network constructions and applications to reactive transport. Journal of Contaminant Hydrology 192, Jul. 12, 2016, 17 pages.

Yan et. al., Foam sweep in fractures for enhanced oil recovery, Colloids and Surfaces A: Physicochem Eng. Aspects, Feb. 24, 2006, 12 pages.

Yang et al, An automatic in situ contact angle determination based on level set method, Water Resources Research, May 29, 2020, 14 pages.

Yang et. al., A generalized approach for estimation of in-plane curvature in invasion percolation models for drainage in fractures, Water Resources Research, vol. 48, Sep. 6, 2012, 12 pages.

Yang et. al., Effect of aperture field anisotropy on two-phase flow in rough fractures, Advances in Water Resources 132, 2019, 11 pages.

Yang et. al., Modeling immiscible two-phase flow in rough fractures from capillary to viscous fingering, Water Resources Research, 2019, 24 pages.

Ye et. al., Two-phase flow properties of a horizontal fracture: The effect of aperture distribution, Advances in Water Resources 76, 2015, 12 pages.

Yeo et. al., Effect of shear displacement on the aperture and permeability of a rock fracture, Int. J. Rock Mech. Min. Sci. vol. 35, 1998, 20 pages.

Yi, et al., Pore network extraction from pore space images of various porous media systems, Water Resources Research, Apr. 26, 2017, 22 pages.

Young, III. An essay on the cohesion of fluids, https://royalsocietypublishing.org, Dec. 20, 1804, 23 pages.

Zankoor et al., In-Situ Capillary Pressure and Wettability in Natural Porous Media: Multi-Scale Experimentation and Automated Characterization Using X-Ray Images, Journal of Colloid and Interface Science 603, Jun. 15, 2021, 14 pages.

Zankoor et. al., Supplementary Information: In-Situ Capillary Pressure and Wettability in Natural Porous Media: Multi-Scale Experimentation and Automated Characterization Using X-Ray Images, Journal of Colloid and Interface Science 603, Jun. 15, 2021, 14 pages.

Zhao, et al., Comprehensive comparison of pore-scale models for multiphase flow in porous media, Proceedings of the National Academy of Sciences vol. 116, No. 28, Jun. 21, 2019, 8 pages.

Zhao, et al., Simulation Of Quasi-Static Drainage Displacement In Porous Media On Pore-Scale: Coupling Lattice Boltzmann Method And Pore Network Model. Journal of Hydrology 588, May 23, 2020, 16 pages.

Zhao, et al., The Effect Of Wettability Heterogeneity On Relative Permeability Of Twophase Flow In Porous Media: A Lattice Boltzmann Study. Water Resources Research 54, Feb. 27, 2018, 17 pages.

Zhou, et al., Computation of three-phase capillary entry pressures and arc menisci configurations in pore geometries from 2d rock images: a combinatorial approach. Advances In Water Resources 69, Apr. 2, 2014, 16 pages.

Zhou, et al., Dynamic capillary pressure curves from pore-scale modeling in mixed-wet-rock images. SPE Journal Aug. 2013, 12 pages.

Zhu, et al., Limits Of The Hydrodynamic No-Slip Boundary Condition. Physical Review Letters, vol. 88, No. 10, Mar. 11, 2002, 4 pages.

Zolfaghari et al., Pore-Scale Network Modeling of Three-Phase Flow Based on Thermodynamically Consistent Threshold Capillary Pressures. I. Cusp Formation and Collapse, Transport in Porous Media, 2017, 46 pages.

Zolfaghari, et al., Pore-scale Network Modeling of Three-Phase Flow Based on Thermodynamically Consistent Threshold Capillary Pressures. I. Cusp Formation and Collapse Transport in Porous Media, Jan. 21, 2017, 46 pages.

Zolfaghari, et al., Pore-scale Network Modeling of Three-Phase Flow Based on Thermodynamically Consistent Threshold Capillary Pressures. II. Results Transport in Porous Media 116:1139-1165, Jan. 21, 2017, 27 pages.

Schroeder, et al., The Visualization Toolkit, An Object-Oriented Approach To 3D Graphics, Edition 4.1, VTK, Jul. 2018, 558 pages.

PCT/US2023/31400, International Search Report and Written Opinion dated Jan. 31, 2024, 26 pages.

PCT/US2023/31329, International Search Report and Written Opinion dated Nov. 21, 2023, 13 pages.

PCT/US2023/31338, International Search Report and Written Opinion dated Mar. 18, 2024, 22 pages.

PCT/US2024/26432, International Search Report and Written Opinion dated Aug. 22, 2024, 17 pages.

PCT/US2024/44240, International Search Report and Written Opinion dated Nov. 4, 2024, 17 pages.

Brooks et al., Hydraulic Properties of Porous Media, Hydrology Papers, Mar. 1964, 37 pages.

* cited by examiner

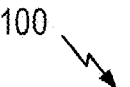
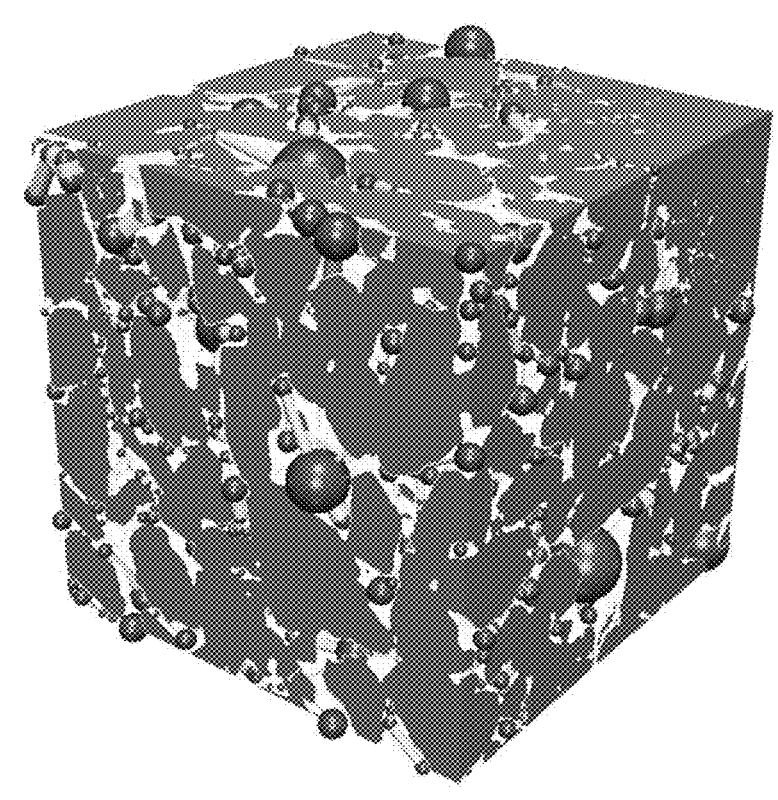
*FIG. 1A*
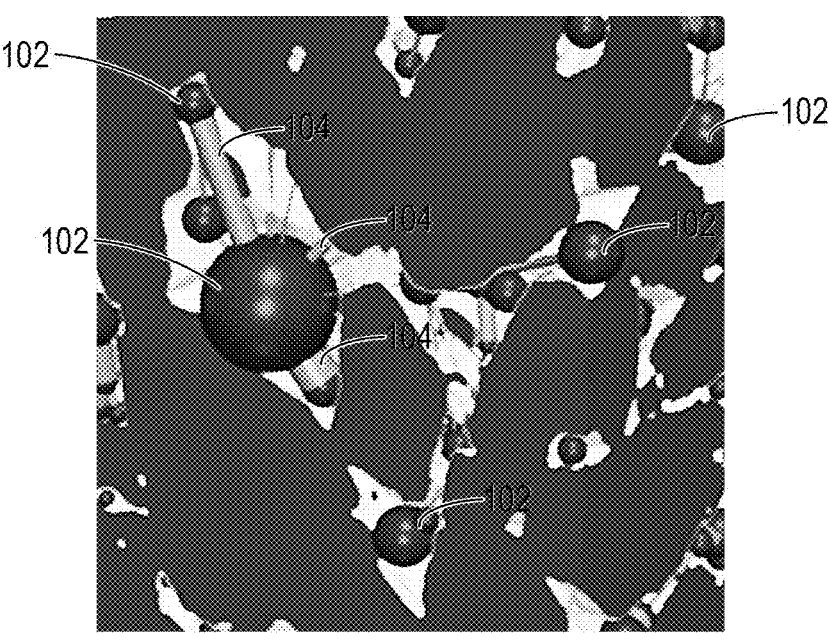
*FIG. 1B*

300

400

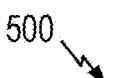
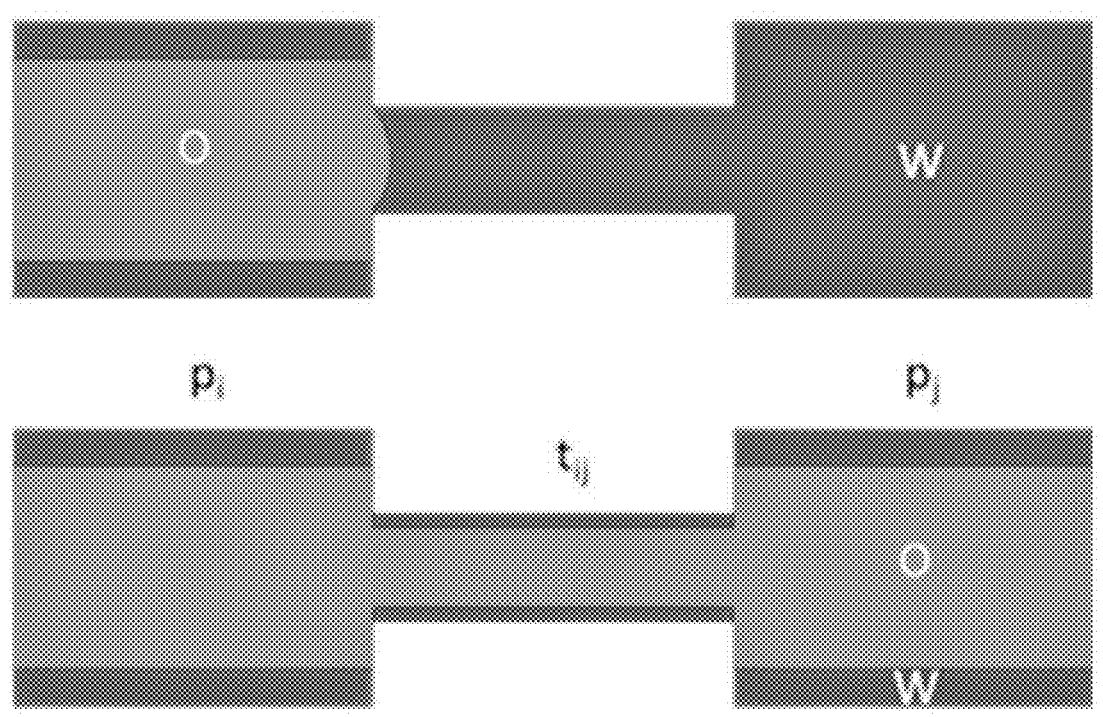
*FIG. 5*

700
FIG. 7

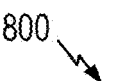
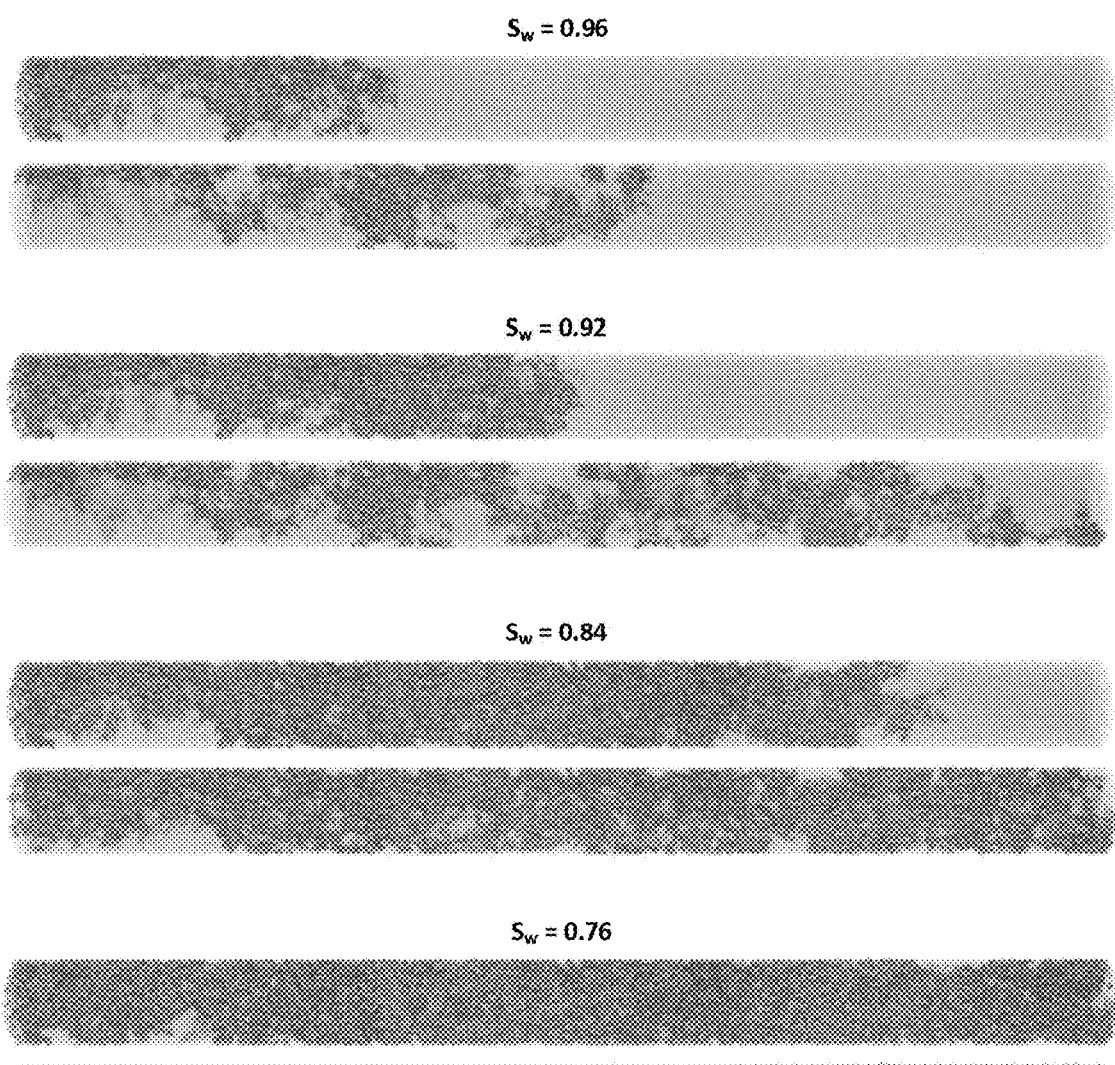
*FIG. 8*

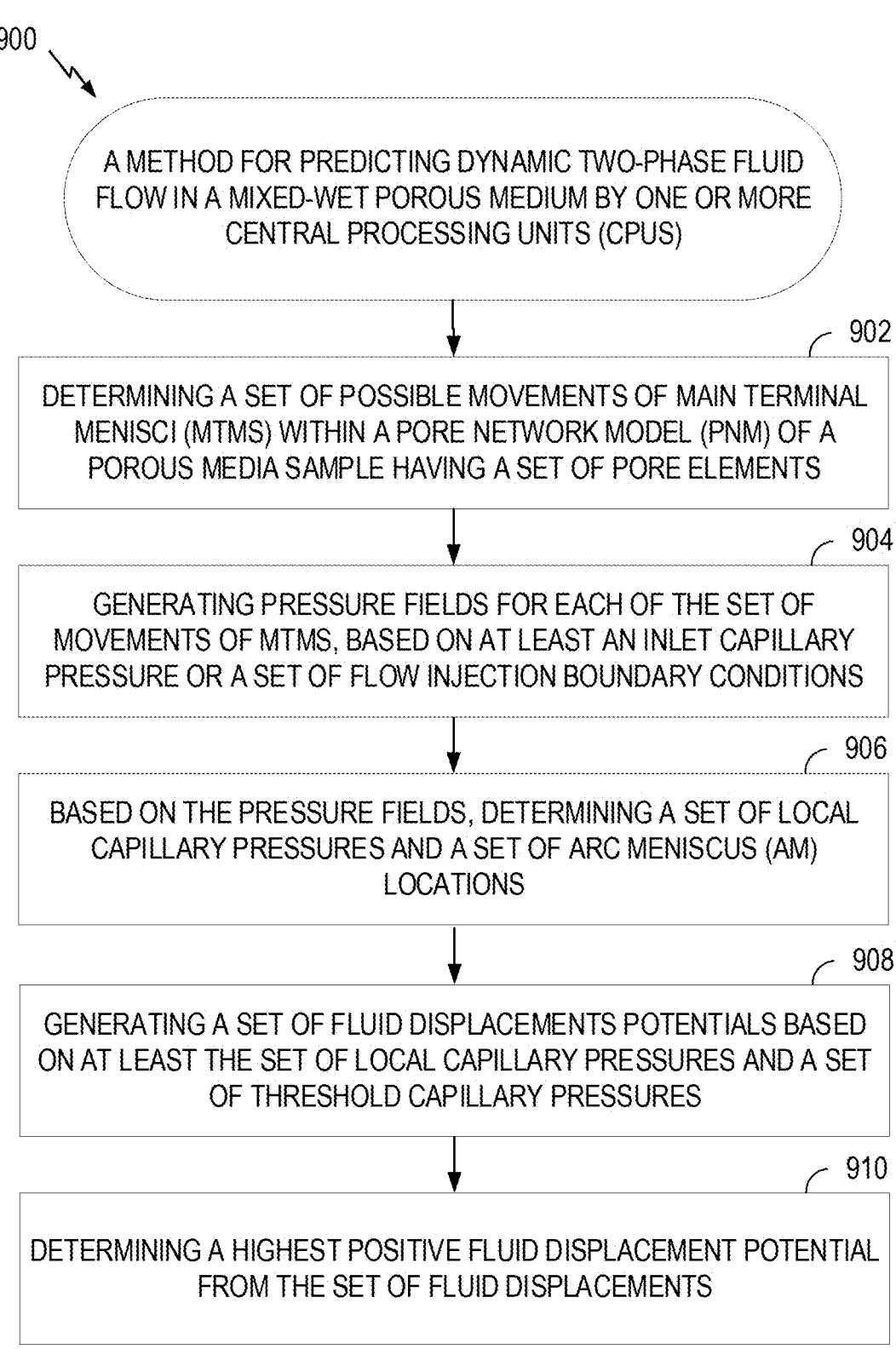

900

A METHOD FOR PREDICTING DYNAMIC TWO-PHASE FLUID FLOW IN A MIXED-WET POROUS MEDIUM BY ONE OR MORE CENTRAL PROCESSING UNITS (CPUS)

902

DETERMINING A SET OF POSSIBLE MOVEMENTS OF MAIN TERMINAL MENISCI (MTMS) WITHIN A PORE NETWORK MODEL (PNM) OF A POROUS MEDIA SAMPLE HAVING A SET OF PORE ELEMENTS

904

GENERATING PRESSURE FIELDS FOR EACH OF THE SET OF MOVEMENTS OF MTMS, BASED ON AT LEAST AN INLET CAPILLARY PRESSURE OR A SET OF FLOW INJECTION BOUNDARY CONDITIONS

906

BASED ON THE PRESSURE FIELDS, DETERMINING A SET OF LOCAL CAPILLARY PRESSURES AND A SET OF ARC MENISCUS (AM) LOCATIONS

908

GENERATING A SET OF FLUID DISPLACEMENTS POTENTIALS BASED ON AT LEAST THE SET OF LOCAL CAPILLARY PRESSURES AND A SET OF THRESHOLD CAPILLARY PRESSURES

910

DETERMINING A HIGHEST POSITIVE FLUID DISPLACEMENT POTENTIAL FROM THE SET OF FLUID DISPLACEMENTS

METHODS AND DEVICES FOR DYNAMIC PORE NETWORK MODELING OF TWO-PHASE FLOW IN MIXED-WET POROUS MEDIA

CROSS-REFERENCE TO RELATED APPLICATIONS

This applications claims benefit of U.S. Provisional Patent Application No. 63/402,002, filed Aug. 29, 2022, the entirety of which is herein incorporated by reference.

BACKGROUND

Field

Aspects of the present disclosure generally relate to methods and systems for physical characterization of porous media, and more particularly, to predicting dynamic two-phase fluid flow in a mixed-wet porous medium.

Description of the Related Art

Modeling techniques for fluid flow through porous media are broadly implemented for petroleum resource development, materials engineering, food packaging, and medical technology development. Fluid flow modeling techniques may be equipped to illustrate both physical and chemical media properties like permeability, capillary pressure, fluid saturation, contact angle, wettability, or other similar properties, which may be used to characterize fluid behavior within a porous media sample without requiring expensive destruction of the sample.

Although current techniques for modeling fluid flow through porous media are based on technological advancements made over many years, resultant models may still be tenuous representations of actual porous media. For example, fluid flow models of porous media may require low-resolution implementations to match currently available computational capabilities. As a result, fluid flow models based on porous media having microscale porosities may not accurately reflect physical and chemical properties of the media. Accordingly, there is an impetus to improve the accuracy of fluid flow modeling, including, for example: improving image processing techniques to allow for higher resolution model input and model output, improving image processing techniques to allow for more accurate model input and model output, improving in-situ characterization extraction techniques to better capture fluid behavior in microscale pore features, enhancing computational processing capability to reduce computational expense, enhancing computational processing capability increase modeling speed, increasing automation for iterative modeling steps, improving model capability for dynamic modeling of different fluid flow environments, improving model capability for dynamic modeling of larger fluid flow environments, and the like.

Consequently, there exists a need for further improvements in fluid flow modeling of porous media to overcome the aforementioned technical challenges and other challenges not mentioned.

SUMMARY

One aspect of the present disclosure provides a method for predicting dynamic two-phase fluid flow in a mixed-wet porous medium by one or more central processing units (CPUs). The method may include generating a set of movements of main terminal menisci (MTMs) of a two-phase fluid within a pore network model (PNM) of a porous media sample having a set of pore elements by generating a pressure field for each of the movements of MTMs based on at least an inlet capillary pressure or a set of flow injection boundary conditions. The method may include identifying a set of local capillary pressures and a set of arc meniscus (AM) locations based on the pressure field. The method may include identifying a set of fluid displacement potentials based on at least the set of local capillary pressures and a set of threshold capillary pressures. The method may include identifying a highest positive fluid displacement potential from a set of fluid displacements of the two-phase fluid within the PNM. The method may include performing a set of fluid displacements of the two-phase fluid within the PNM based on the highest positive fluid displacement potential.

One aspect of the present disclosure provides a non-transitory computer-readable medium comprising computer-executable instructions for predicting fluid flow in a mixed-wet porous medium that, when executed by one or more processors, cause one or more central processing units (CPUs) to perform a method of predicting fluid flow in the mixed-wet porous medium. The method may include generating a set of movements of main terminal menisci (MTMs) of a two-phase fluid within a pore network model (PNM) of a porous media sample having a set of pore elements by generating a pressure field for each of the movements of MTMs based on at least an inlet capillary pressure or a set of flow injection boundary conditions. The method may include identifying a set of local capillary pressures and a set of arc meniscus (AM) locations based on the pressure field. The method may include identifying a set of fluid displacement potentials based on at least the set of local capillary pressures and a set of threshold capillary pressures. The method may include identifying a highest positive fluid displacement potential from a set of fluid displacements of the two-phase fluid within the PNM. The method may include performing a set of fluid displacements of the two-phase fluid within the PNM based on the highest positive fluid displacement potential.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only example aspects and are therefore not to be considered limiting of its scope, may admit to other equally effective aspects.

FIG. 1A depicts an example pore network extracted from a porous media sample made of sandstone.

FIG. 1B depicts an example set of high-resolution porous media image taken by a scanning instrument from a single rock sample and segmented for characterization.

FIG. 5 depicts example main terminal menisci (MTM) movement between pore elements connected by a throat.

FIG. 7 depicts example decomposition applied to a pore network model (PNM) for fluid flow prediction procedures performed in parallel by one or more CPUs.

FIG. 8 depicts example core flooding predictions associated with increasing water saturation levels.

FIG. 9 is a flow diagram illustrating certain operations by one or more CPUs, according to certain aspects of the present disclosure.

To facilitate understanding, identical reference numerals have been used, where possible, to designate identical elements that are common to the figures. It is contemplated that elements and features of one aspect may be beneficially incorporated in other aspects without further recitation.

DETAILED DESCRIPTION

Figure 2:
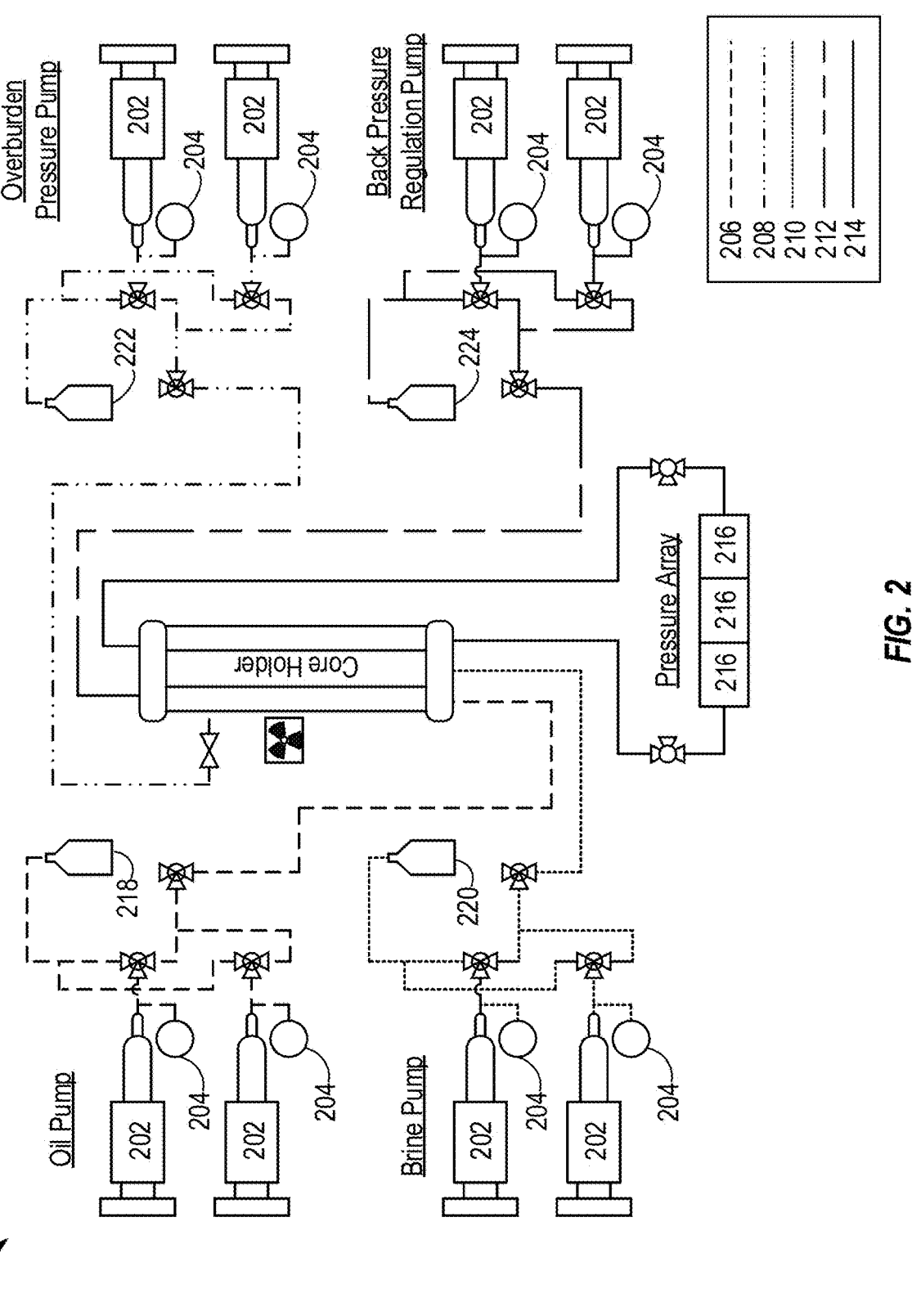
FIG. 2 depicts an example core-flooding instrument for determining the physical and chemical characteristics of a porous media sample.

In the following, reference is made to aspects of the disclosure. However, it should be understood that the disclosure is not limited to specifically aspects described. Instead, any combination of the following features and elements, whether related to different aspects or not, is contemplated to implement and practice the disclosure. Furthermore, although aspects of the disclosure may achieve advantages over other possible solutions and/or over the prior art, whether or not a particular advantage is achieved by a given aspect is not limiting of the disclosure. Thus, the following aspects, features, embodiments, and advantages are merely illustrative and are not considered elements or limitations of the appended claims except where explicitly recited in a claim(s). Likewise, a reference to "the disclosure" shall not be construed as a generalization of any inventive subject matter disclosed herein and shall not be considered to be an element or limitation of the appended claims except where explicitly recited in a claim(s).

The present disclosure relates to techniques for physical characterization of porous media. Specifically, the techniques discussed herein may be implemented for predicting dynamic two-phase fluid flow in a mixed-wet porous medium. The porous media sample may comprise a digital rock sample, a rock sample, a core sample, a plastic sample, a tissue sample, or any other organic or inorganic sample having pore space ascertainable through imaging techniques.

A thorough grasp of fluid flow through porous spaces of certain materials may be consequential to enhancing technical efficacy of fluid flow techniques in a wide range of industries. Models of fluid flow are useful to describe physical and chemical characteristic of a porous material and may help to highlight the material's optimal usage. Often, networks of pores within a material are extremely small, ranging from nanoscale to microscale in size. Techniques for characterizing these pore networks are hindered by the computational expense of modeling at a microscale. To alleviate computational burdens, pore network modeling techniques often use generalized characterization techniques at expense of model accuracy. Extrapolation errors caused by such imprecise characterization may result in mischaracterization of physical and chemical characteristics of the porous material. In many cases, these errors render such models impractical for regular use. Accordingly, ideal modeling of fluid flow through porous media would allow for rapid, accurate characterization of pore spaces that may be performed without inhibitive computational expense.

Introduction to Pore Network Modeling

Modeling techniques for fluid flow through porous media may illustrate both physical and chemical porous media properties. Models of porous media may be used to ascertain permeability, capillary pressure, fluid saturation, wettability, contact angle, buoyancy, and the like to a greater degree of accuracy comparable to physical flooding of a porous media sample. Additionally, physical and chemical properties determined using pore network modeling techniques may be used to characterize in-situ fluid behavior as it travels through the porous media under a wide variety of wettability and flooding conditions. These conditions may not be accessible to users performing conventional physical flooding characterization techniques.

Permeability is the tendency of the porous media to allow liquids to flow through it. Capillary pressure is the pressure difference existing across the interface separating two immiscible fluids. Fluid saturation is the measurement of fluid present in the pore spaces of the porous media. Contact angle is a measured angle between a fluid-fluid or a fluid-gas interface at a point where it meets a solid surface. Wettability is the ability of a liquid to maintain contact with a solid surface. Wettability may vary depending on wettability conditions and the type of wetting liquid present in the porous media sample. For example, a water-wet medium may show a lower wetting affinity to the oil phase than an oil-wet medium, where higher or lower wetting is determined with respect to a given phase. In certain cases, there may be no correlation between wettability and viscosity ratio, as there may be water or oil wet conditions with similar viscosities.

A pore network is a practical description of a porous medium targeted for fluid flow modeling. FIG. 1A illustrates an example section of a pore network extracted from porous sandstone. The section of the pore network describes the porosities of various size and shape present in that portion of the sandstone, and may be used to model fluid flow through those porosities for various wettability conditions. Three-dimensional (3D) portions of a pore network model may more accurately characterize the porous media sample either alone or in combination with other 3D portions of the pore network model.

Pore networks (e.g., of FIG. 1A) may be extracted from images of a targeted porous medium and used in pore-network models to model multi-phase fluid flow using physically-based displacement mechanisms (PBDMs) across pores defined in a pore network. PBDMs may represent an estimated displacement of a modeled fluid in response to movement of another fluid or gas within the pore network. As immiscible phases react with one another throughout the pore network during fluid flooding a displacement occurs For example, a capillary pressure across a meniscus exceeds the wettability constraints on either phase causes a displacement. Fluid saturation, contact angle, buoyancy, and the like may also affect PBDMs throughout a pore network. By utilizing a pore network model extracted from a porous media sample, a user may be able to ascertain PBDMs through the porous media sample under a wide variety of wettability conditions. This may ultimately allow a user to obtain, for example, useful permeability for a larger sample of the porous medium without degrading a porous media sample via repeated physical flooding.

To properly generate PBDMs at a pore scale for the targeted porous media, imaging may capture complex geometries of the targeted porous media at a resolution sufficiently high to retain acceptable accuracy. An example of these geometries is illustrated in FIG. 1B. Pores may be defined as a complex polyhedron having at least a center 102 and spherical and effective diameters. Connective throats 104 between pores may also be defined. In many cases, image resolution may be in micrometers or nanometers to capture applicable pore detail. High-resolution pore models allow for accurate rendering of the fluid flow characteristics described above as ascertained at each pore and for each PBDM.

PBDMs may occur upon flooding or draining of a pore network, where aqueous phase injection or removal is iteratively simulated through the pore network. Aqueous flooding and aqueous draining may be implemented in various modeled wettability conditions, where certain fluids are present prior to the start of a simulation. Wettability conditions may include at least water-wet, oil-wet, or mixed-wet conditions. During aqueous flooding, injected water may displace immiscible fluid preexisting in the pore network model. During aqueous draining, injected immiscible fluid may displace water preexisting in the pore network model. In certain cases, flooding and draining may be fluid flooding and fluid draining. In some cases, fluid may be oil.

Flooding or draining in a pore network may be simulated based in part on scanned images of physical flooding implemented by a flooding instrument 200 of FIG. 2. In some cases, a porous media may undergo a core-flooding experiment to establish an irreducible water saturation, a residual oil saturation, or both. Core-flooding may be enabled by a set of pumps 202, rupture disks 204, pump lines 206-214, differential pressure transducers 216, and source buckets 218-222 working in tandem to flood a porous media sample loaded in a core holder. In some cases, a scanning instrument (e.g., a micro computed tomography (micro-CT) scanner) captures a dry reference image prior to flooding. Scanning occurs in a field of view defined within the core holder. In some cases, the porous media sample may be flooded with brine from bucket 220 via the brine tubing line 206 and scanned again to ensure that the porous media sample is fully saturated. Once the brine flooding is complete, the absolute permeability of the porous media sample may be obtained. The oil flooding may be performed alongside additional brine flooding. Any fluid expelled as a result of overburden pressure (i.e., pressure that compacts pore space and reduces permeability) may be transported via the confining fluid line 208 and collected in bucket 222. Any fluid expelled as a result of the flooding procedure may be transported via the effluent fluid line 212 and collected in bucket 224. In many cases, core sample pressure may be iteratively adjusted during flooding. Pressure may be recorded by one or more differential pressure transducers 216 coupled to the core holder via a transducer line 214.

Scanned images obtained from flooding procedures performed by the flooding instrument 200 of FIG. 2 may be used to extract a pore map representative of the porous media sample. The images may be processed to determine characteristics of fluid flow through the porous media sample. In many cases, the images may also be used to extract a representative pore network model.

Imaging of porous media is typically performed using micro-CT imaging. In many cases, commercial micro-CT scanners (e.g., Zeiss scanners) are available for imaging necessary to perform pore network modelling. Images of porous media taken by micro-CT scanners are at a sufficiently high resolution to create a microscale digital image of the porous media.

In the current state of the art, there exists a challenge of extracting porous media characteristics in a manner precise and repeatable to ensure the ultimate stability of future simulations. Currently, techniques for porous media characterization require lengthy step-wise processing known to incur undue computational expense and introduce instability to characterization of the porous media sample. As a result, users may not be able to rely on characterization output to simulate flow conditions in a useful way.

Aspects Related to Dynamic Pore Network Modeling of Two Phase Flow in Mixed-Wet Media In the current state of the art, there exists a challenge of predicting fluid flow through porous media in a manner precise and repeatable to ensure the ultimate stability of future simulations. Currently, techniques for two-phase fluid flow prediction in mixed-wet media require lengthy step-wise processing known to incur undue computational expense and introduce instability to the characterization of the porous media sample. As a result, users may not be able to rely on characterization output to simulate flow conditions in a useful way.

Fluid flow modelling through porous media is often utilized to enhance petroleum resource development. In recent years, global demand for energy resources has mobilized development of petroleum reservoirs as targets for hydrocarbon extraction. The geological formations that comprise these hydrocarbon reservoirs may be ultra-tight shale formations resistant to primary petroleum extraction techniques. A matrix of an ultra-tight shale reservoir may be characterized by low permeability and low porosity. To extract hydrocarbons from the ultra-tight shale matrix, secondary and tertiary petroleum extraction techniques seek to maximize oil production through the microscale pore networks that comprise a substantial amount of the porosity in the shale matrix.

A robust understanding of fluid flow through microscale pore networks of unconventional reservoirs may be consequential to extracting the trillions of barrels of oil still housed in shale formations globally. Models of fluid flow through a pore network that describe permeability, capillary pressure, fluid saturation, and wettability may help to elucidate specific steps to be taken during resource development to optimize petroleum production. Even so, techniques for characterizing these microscale pore networks are hindered by the computational expense of modeling sub-resolution pore network and extrapolation errors caused by unstable characterization of pore geometries.

As discussed above, ideal modeling of fluid flow through porous media would allow for precise, quick, and repeatable predictive fluid flow simulation through a porous media sample. For example, in a case where the porous media sample is a cylindrical core sample of a rock having a length of six inches and a diameter of one inch, the core sample is likely to have porosity and permeability that vary across its length and width. This is common in core samples, and especially in core samples representative of ultra-tight oil formations. Geological processes that form certain oil-bearing rocks can produce heterogeneous (i.e., disordered) morphological features in the rock that may be present even at a sub-resolution scale. This is especially true for oil-bearing carbonate rocks, which contain micro-porosities that contribute significantly to the overall porosity of the rock. These microscale morphological features may affect the pore network of the core sample, altering the porosity and permeability throughout a core sample. Thus, accurate characterization of fluid flow through a core sample may depend on precisely ascertained and verifiable microscale geometries sufficient to detect heterogeneous properties of a pore network. These microscale geometries often have complex microscale curvature. Using conventional prediction techniques that cannot consistently capture the heterogeneity of the core sample may result in characterization of a porous media sample that cannot be used to consistently describe fluid flow through the core sample.

In certain cases, current models may assume that either pore bodies or pore throats have volume equivalent to zero. This assumption is unrealistic because the total volume of each of these pore elements may constitute a significant proportion of the pore network present in the porous medium.

Additionally within the current state-of-the-art pore elements may only accommodate uniform wettability configurations, where fluid flow simulations are typically performed under strongly water-wet wettability conditions. Thus, oil-wet and mixed-wet wettability states may not be ascertainable using dynamic pore network modelling methods.

Aspects of the present disclosure are directed to techniques for predicting dynamic two-phase fluid flow in a mixed-wet porous medium using computationally efficient, parallelized dynamic pore-network models (PNM). These techniques may generate a fluid flow prediction through a loosely-coupled dynamic PNM (LCD-PNM). Implementation of aspects described herein may facilitate physics-based, pore-scale simulations of two-phase flow processes in large-scale disordered pore networks that may incorporate a wide range of fluid-fluid properties, including wettability and flow conditions.

According to aspects of the present disclosure, the fluid flow prediction procedure may be performed by a processing system architecture comprising at least one or more CPUs operating in parallel. The one or more CPUs may perform the prediction procedure according to a non-transitory computer readable medium that causes the one or more CPUs to perform any and all steps of the extraction procedure. Each of the one or more CPUs may be utilized in combination with a memory having the computer readable medium stored thereon. Each of the one or more CPUs be utilized in combination with one or more processors. Each of the one or more processors may be parallel processors. Each of the CPUs may operate independently, or may use a message passing interface (MPI) enabling communication between one or more parallel processors for performing the extraction procedure.

The LCD-PNM may be extracted in a seamless and deterministic manner from micro-CT images of a porous media sample (e.g., a core sample). Aspects described herein may then allow one or more CPUs to utilize the LCD-PNM to investigate the effects of a numerous parameters. Such parameters may include wettability and flow conditions on oil, water, and other fluids, relative permeabilities and residual oil saturation, and may be evaluated either alone or in combination. The one or more CPUs may use the LCD-PNM to predict various displacement flow regimes, including viscous fingering, capillary fingering, and stable front displacement. This may be achieved by adjusting fluid-fluid properties (e.g., interfacial tension (IFT) and fluid viscosity ratio). The fluid flow predictions provided by one or more CPUs may provide invaluable insights into the complex interplay between the viscous and capillary forces controlling pore-scale displacements, which may impact the macroscopic behavior of two-phase flow processes.

Aspects of the present disclosure provide an efficient and robust framework to carry out pore-scale displacements based on the fluid pressure fields that are updated frequently during flow simulations. The efficiency of framework combined with the parallelization of the platform across one or more CPUs may facilitate performing fluid flow prediction in large core-sized pore networks within a practical amount of time.

Figure 3:
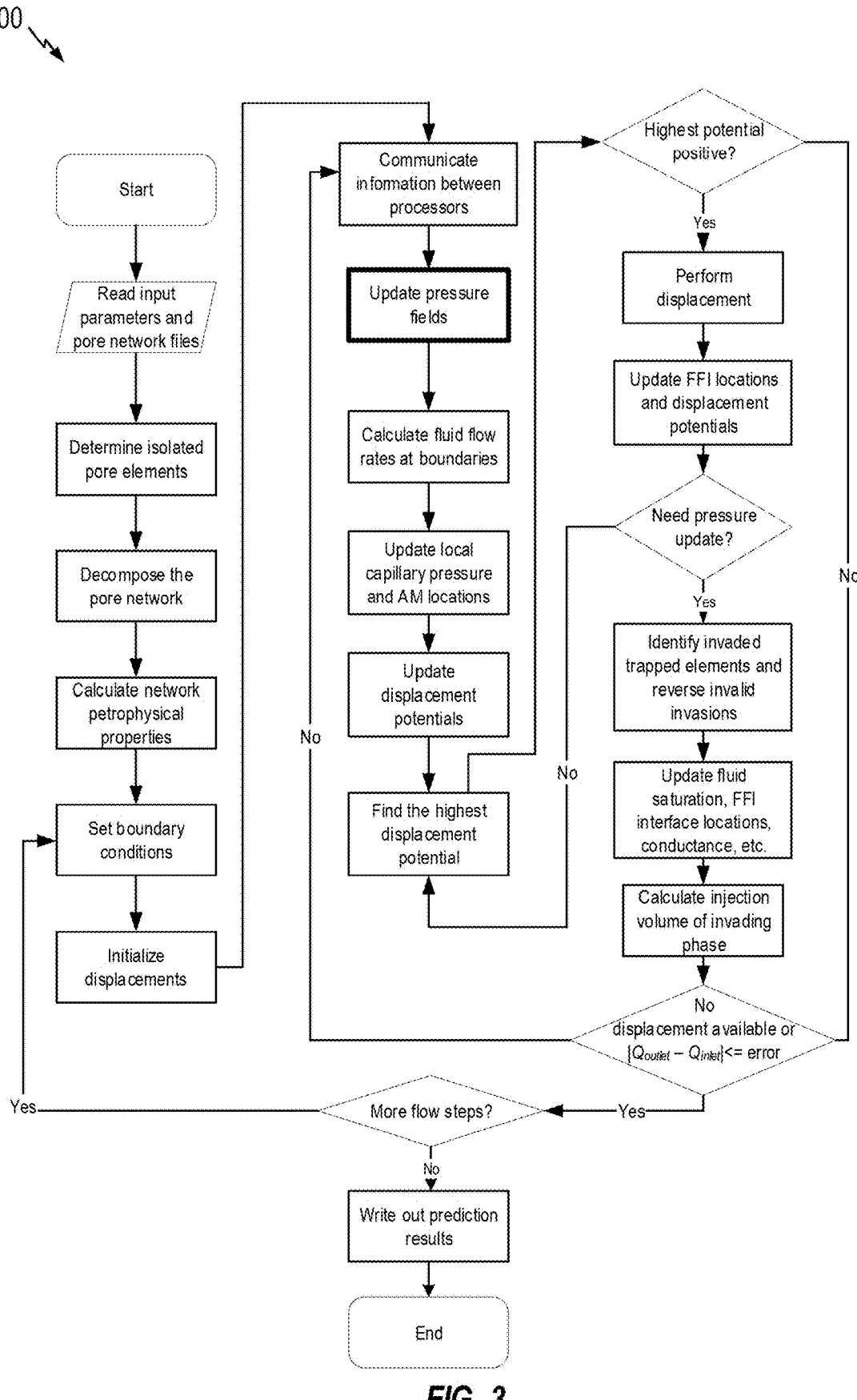
FIG. 3 depicts an example fluid flow prediction procedure for mixed-wet porous media by one or more central processing units (CPU).

According to certain aspects, FIG. 3 depicts an example flow diagram describing example actions taken by one or more CPUs to implement fluid flow prediction. First, one or more CPUs read in one or more input parameters and pore network files. For example, the CPUs may obtain an extracted pore network model at the start of prediction. The CPUs then determine isolated pore elements and decompose the network. Network decomposition may allow the one or more CPUs to process the fluid flow prediction more efficiently. Each of the CPUs calculate petrophysical properties of the LCD-PMN, set boundary conditions, then initialize displacements. This information is then communicated between CPUs. The CPUs then begin the process of updating pressure fields within the LCD-PNM (discussed below with respect to FIG. 4). After updating the pressure fields, the CPUs calculate the fluid rates at boundaries, update local capillary pressure and arc meniscus (AM) locations, then update displacement potentials. The CPUs determine the highest displacement potential. If the highest displacement potential is positive, then the CPUs perform the displacement associated with the potential. If the highest positive displacement potential is not positive, the CPUs determine whether there are more flow steps. If yes, the next flow step will be used. If not, the CPUs write our prediction results and end the fluid flow prediction.

After the CPUs perform a displacement, they update FFI locations and displacement potentials. The CPUs then determine whether the displacement requires a pressure displacement. If the displacement requires a pressure update, the CPUs identify invaded trapped elements and reverse the invalid invasions, calculate the injection volume of the invading phase, and update fluid saturation, FFI interface locations, conductance, and other parameters, and evaluate whether there is a displacement available or whether the difference between the outlet and inlet capillary pressures is lower than a threshold error value. If the displacement does not require a pressure update, the CPUs find the highest displacement as described above.

If there is no displacement available or the difference is lower than the threshold error value, the CPUs determine whether there are more flow steps. If there are more flow steps, then the CPUs set boundary conditions as described above. If there are not more flow steps, the CPUs write our prediction results and end the fluid flow prediction.

Figure 4:
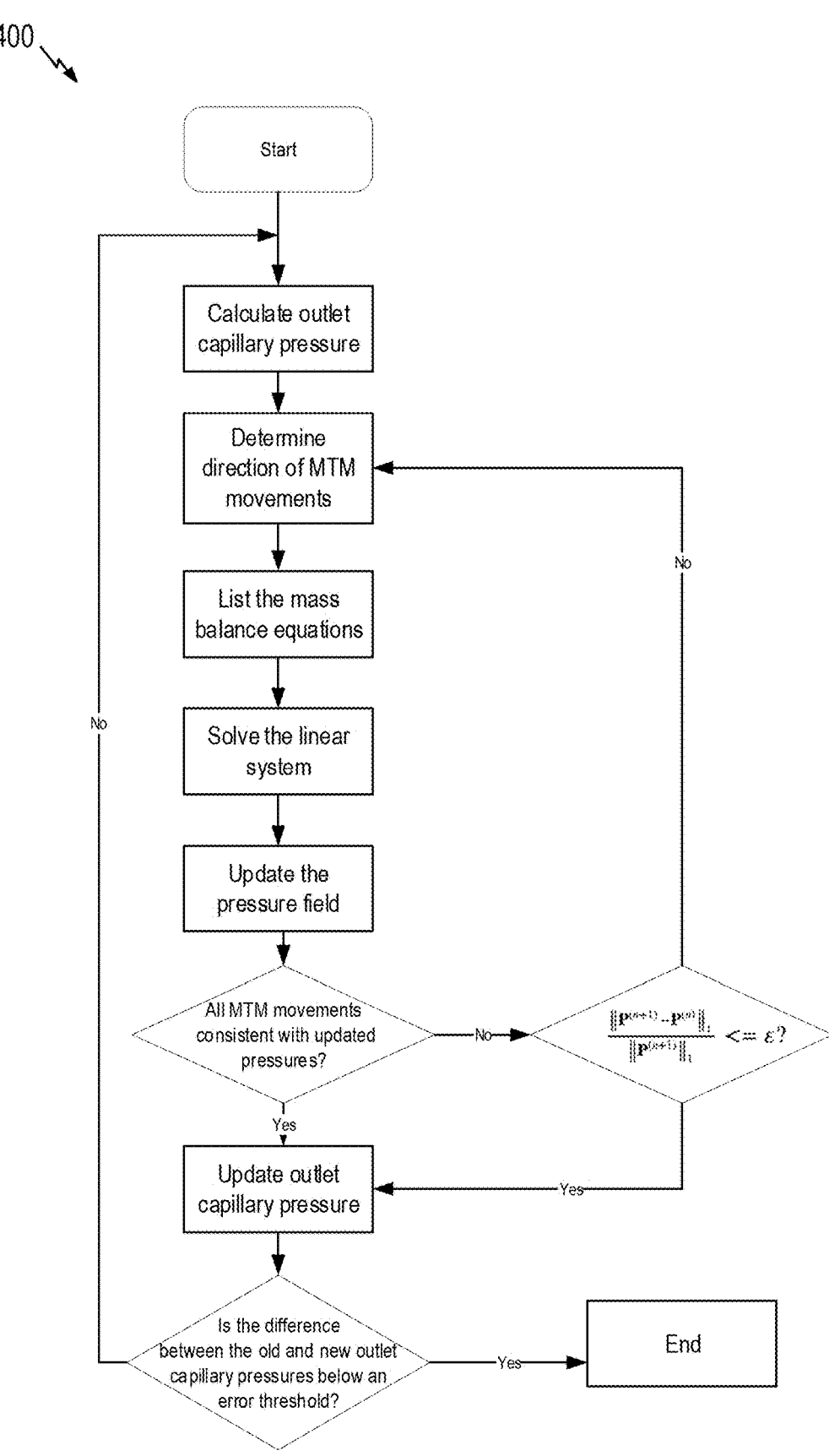
FIG. 4 depicts an example fluid flow prediction procedure for mixed-wet porous media by one or more CPU.

FIG. 4 depicts an example flow diagram describing example actions taken by one or more CPUs to implement fluid flow prediction, specifically with respect to the updating fluid pressure fields action described in FIG. 3. At the start of the pressure field update, one or more CPUs calculate outlet capillary pressure. Then, based on the outlet capillary pressure, the CPUs determine the direction of main-terminal meniscus (MTM) movements. The CPUs then list the mass balance equations for each pore element accounted for within the fluid flow prediction procedure. The CPUs solve the linear system for the mass balance equations and update the pressure field accordingly. Then, the CPUs determine whether all MTM movements are consistent with the updated pressure fields. If MTM movements are not consistent with the updated pressure fields, the CPUs determine whether the relative error of the vector of the pressure values calculated over two consecutive iterations satisfies an error tolerance. If the error tolerance is satisfied, the CPUs updates the outlet capillary pressure. If the error tolerance is not satisfied, the CPUs repeat the determination of MTM movements and proceeding steps until the difference between the previous and current pressure updates divided by the current pressure update is less than a threshold error value. After updating the outlet capillary pressure, the CPUs determine whether the difference between the inlet and outlet capillary pressures is below a certain threshold. If the difference is not below a certain threshold, the CPUs start over, calculating the outlet capillary pressure again. If the difference is below a certain threshold, the CPUs end the pressure update and output the outlet capillary pressure for use in the fluid flow prediction procedure of FIG. 4.

According to certain aspects of the present disclosure, the CPUs may use simplifying assumptions specific to the needs of dynamic pore-network modeling of fluid flow through mixed-wet porous media. In one case, all pore bodies and pore throats are assumed to possess non-zero values for volume, conductance, and local capillary pressure. In one case, the CPUs may assume any commonly used cross-sectional shapes for each pore element within the pore network model. This includes, but is not limited to, circle, square, and triangle cross-sections.

Figure 6:
FIG. 6 depicts example geometries associated with arc menisci (AM) movement.

MTMs and AMs may be defined during the fluid flow prediction procedure. FIG. 5 illustrates an example MTM as an invading phase (oil, denoted "O") moving from one pore space, $P_i$, to another pore space, $P_j$, across an MTM, $t_{ij}$. The invading phase displaces the defending fluid (water, denoted "W"). FIG. 6 illustrates an example AM and movement geometries associated with an invading phase (oil, denoted "O") as it pushes against a defending phase (water, denoted "W") as it rests in the corner of a pore space.

The CPU may determine whether a pore element is occupied concurrently by two fluids. The corner areas covered by the wetting phase may have a different set of advancing and receding contact angles compared to a center that is in contact with a non-wetting phase. Accordingly, a pore network model implemented by one or more CPUs may include oil layer formation and collapse phenomena that play an important role during water flooding in oil-wet porous media.

To calculate the fluid pressure fields, the one or more CPUs may list a mass conservation equation for each phase, $\alpha$, in every non-isolated pore element. In some cases, the CPUs may assume fluids are Newtonian fluids, which are incompressible, and immiscible. Accordingly, the mass conservation equation may simplify to a volume conservation equation. For a pore body, i, within a pore network model, the pore body may be connected to a set of pore throats $\Omega$. In this case, the CPUs may apply the following volume conservation equation:

$$\sum_{j\in\Omega} q_{\alpha,i-ij} = 0$$

Here, $q_{\alpha,i-ij}$ may be the flow rate of phase $\alpha$ between pore body i and pore throat ij. If no MTM exists between pore bodies i and j (i.e., the same fluid phase occupies the center of pore elements i, j, and ij, $q_{\alpha,i-j}$ can be computed from the following equation:

$$q_{\alpha,i-j} = \frac{g_{\alpha,i-j}}{L_{i-j}}[(p_{\alpha,j} - p_{\alpha,i}) + \rho_\alpha g(h_j - h_i)\sin(\phi)], \ \alpha = o, w$$

Here, $\rho$ may be the phase density, g may be the value of the gravitational acceleration, $h_k$ may be the distance from the inlet to the center of pore element k, and $\phi$ may be the angle between the flow direction and the horizontal plane. The conductance per unit length, $g_{\alpha,i-j}/L_{i-j}$, may be computed as the harmonic average of and $g_{\alpha,i-ij}/L_{i-ij}$, and $g_{\alpha,j-ij}/L_{j-ij}$, where $g_{\alpha,k-ij}$ is the conductance of phase $\alpha$ between pore body k and pore throat ij, and $L_{k-m}$ is the distance between the centers of pore elements k and m. After the system of linear equations is solved, fluid pressures in pore throat ij may be back-calculated from the pressures of its neighboring pore bodies using the following equations:

$$p_{o,ij} = A_{\alpha,i}[p_{\alpha,i} + \rho_\alpha g(h_i - h_{ij})\sin(\phi)] + B_{\alpha,ij}[p_{\alpha,j} + \rho_\alpha g(h_j - h_{ij})\sin(\phi)]$$

$$A_{\alpha,ij} = \frac{g_{\alpha,i-ij}/L_{i-ij}}{g_{\alpha,i-ij}/L_{i-ij} + g_{\alpha,j-ij}/L_{j-ij}}$$

$$B_{\alpha,ij} = \frac{g_{\alpha,j-ij}/L_{j-ij}}{g_{\alpha,i-ij}/L_{i-ij} + g_{\alpha,j-ij}/L_{j-ij}}$$

When an MTM exists between the pore bodies i and j, the CPUs may explicitly list the mass conservation equations for throat ij and couple the pressure of each fluid phase across the MTM. In one case, assuming oil and water occupy the center of pore body i and pore throat ij, respectively, as shown FIG. 5, $q_{o,i-ij}$ and $q_{w,ij-i}$ may be described as:

$$q_{o,i-ij} = \frac{g_{o,i-ij}}{L_{i-ij}}[(p_{o,ij} - p_{o,i}) + \rho_o g(h_{ij} - h_i)\sin(\phi)] +$$
$$\frac{g_{ce,i-ij}}{L_{i-ij}}\left[\left(p_{w,ij} - p_{o,i} + p_{c,n}^{th}\right) + g(\rho_w h_{ij} - \rho_o h_i)\sin(\phi)\right]$$

$$q_{w,ij-i} = \frac{g_{w,ij-i}}{L_{i-ij}}[(p_{w,i} - p_{w,ij}) + \rho_w g(h_i - h_{ij})\sin(\phi)] +$$
$$\frac{g_{ce,i-ij}}{L_{i-ij}}\left[\left(p_{o,i} - p_{w,ij} - p_{c,n}^{th}\right) + g(\rho_o h_i - \rho_w h_{ij})\sin(\phi)\right]$$

In these equations, $$\frac{g_{ce,i-ij}}{L_{i-ij}}$$

may be the harmonic mean of $$\frac{g_{w,i}}{L_i} \text{ and } \frac{g_{o,ij}}{L_{ij}},$$

where $L_i$ is the distance between the center of pore body i to the entrance of pore throat ij and $L_{ij}$ is half the length of pore throat ij. The threshold capillary pressure of the pore element to be invaded, $$p_{c,n}^{th},$$

is equal to $$p_{c,i}^{th}$$

11                                                                          12 or $$p_{c,ij}^{th}$$

depending on whether the water is displacing the oil or vice versa.

The second term on the LHS of the above equations may describe the movement of the MTM. This term couples the pressure of oil and water in the linear system. Notably, the difference in the values of $$p_c^{th}$$

for the pore body i and pore throat ij, makes the flow equations above nonlinear because the direction of the MTM movement, and hence the value of $$p_c^{th},$$

depend on the values of the fluid pressures themselves. The CPUs may use the pressure values from the previous step to calculate the displacement potential for all the possible local fluid displacements. In an example case, a fluid configuration may be represented by the following equations:

$$\begin{cases} \Phi^{drn} = p_{o,i} - p_{w,ij} - p_{c,ij}^{th} + g(\rho_o h_i - \rho_w h_{ij})\sin(\phi) \\ \Phi^{imb} = p_{w,ij} - p_{o,i} + p_{c,i}^{th} + g(\rho_w h_{ij} - \rho_o h_i)\sin(\phi) \end{cases}$$

Here, $\Phi^{drn}$ and $\Phi^{imb}$ denote oil displacing water, and water displacing oil, respectively, regardless of the wettability state of the pore elements i and ij. Accordingly, the CPUs may determine the local flow rate across the MTM, $$q_{i-ij}^{MTM},$$

as follows:

$$q_{i-ij}^{MTM} \begin{cases} \frac{g_{i-ij}^{ce}}{L_{i-ij}}\left(p_{o,i} - p_{w,ij} - p_{c,ij}^{th} + g(\rho_o h_i - \rho_w h_{ij})\sin(\phi)\right), & \text{if } \Phi^{drn} > \Phi^{imb} \text{ and } \Phi^{drn} > 0 \\ \frac{g_{i-ij}^{ce}}{L_{i-ij}}\left(p_{w,ij} - p_{o,i} + p_{c,i}^{th} + g(\rho_w h_{ij} - \rho_o h_i)\sin(\phi)\right), & \text{if } \Phi^{imb} > \Phi^{drn} \text{ and } \Phi^{imb} > 0 \\ 0, & \text{otherwise} \end{cases}$$

After solving the linear system for the pressure fields, the CPUs may update the displacement potentials as well as the MTM flow directions. If the flow direction alters for any of the MTMs, the CPUs may resolve the pressure fields using the updated flow directions. This iteration over the pressure calculation continues until either there is no discrepancy between the updated MTM flow directions and the ones from the previous step or if both pressure fields across the pore network are converged. A pressure field may be considered to be converged when the relative error of the vector of the pressure values calculated over two consecutive iterations satisfies an the error tolerance:

$$\epsilon_p = \frac{\left\| P^{(n+1)} - P^{(n)} \right\|_1}{\left\| P^{(n+1)} \right\|_1} < \epsilon_{tol}$$

In certain cases, the CPUs may determine an error tolerance of $10^{-3}$ to be sufficient for the simulations to yield satisfactory results over the range of flow and wettability conditions.

In certain cases, a pore network model may have a fluid configuration where no MTM exists in the pore network (e.g., at the start of primary drainage). In this case, the total number of pressure equations applied by one or more CPUs for each phase may be equal to the number of pore bodies the pore network occupies. However, as fluid displacements take place and more MTMs are created during the fluid flow prediction procedure, the total number of pressure equations may increase to the summation of the number of pore bodies and the number of invasion sites, (e.g., movable MTMs).

In certain cases, the CPUs may solve the linear system of mass conservation equations using an algebraic multigrid preconditioned conjugated gradient method. In one example, the one or more CPUs may perform this method using a portable, extensible toolkit for scientific computation (PET Sc) parallel solver package.

According to certain aspects of the present disclosure, the one or more CPUs may support fluid flow prediction for co-injection of both fluid phases at the inlet to faithfully represent the boundary conditions of steady-state flow experiments. To accomplish this, the CPUs may implement a volume conservation equation for each fluid phase at the inlet reservoir according to the following equation:

$$\sum_{ij \in \Omega_{inlet}} q_{\alpha,inlet-ij} = -Q_{\alpha,inlet}$$

Here, $\Omega_{inlet}$ may be the set of all inlet pore throats, and $Q_{\alpha,inlet}$ may be the specified volumetric injection rate of phase $\alpha$. The local flow rates across the MTMs may exist at the entrance of inlet pore throats, with the exception that the MTMs cannot invade the inlet reservoir. In some cases, the fluid flow procedure may readily accommodate unsteady-state displacements by setting $Q_{\alpha,inlet}$ of the defending phase to zero.

At the outlet of the pore network, the one or more CPUs may apply a constant-pressure boundary condition. In some cases, the CPUs may apply a constant-pressure boundary condition averaging the pore-scale capillary pressure across the invasion fronts, according to the following equation:

$$P_{c,outlet} = \sum_{i-ij \in \Gamma_{o-w}} p_{c,i-ij} A_{i-ij} / \sum_{i-ij \in \Gamma_{o-w}} A_{i-ij}$$

Here, $\Gamma_{o-w}$ may be a collection of invasion fronts (e.g., movable MTMs), $p_{c,i-ij}$ may be the local capillary pressure across the MTM formed between the pore body i and pore throat ij, and the cross-sectional area of the MTM, $A_{i-ij}$. In some cases $p_{c,outlet}$ may depend on the fluid pressure values. Following the convergence of the pressure fields, the one or more CPUs may compute the updated outlet capillary pressure $$\left(p_{c,outlet}^{new}\right)$$

accordingly. If the relative error between $$p_{c,outlet}^{new}$$

and $$p_{c,outlet}^{old}$$

is larger than a predetermined error tolerance (e.g., $10^{-1}$), the CPUs may use $$p_{c,outlet}^{new}$$

to repeat the entire pressure field calculation step as described above in FIG. 3.

After pressure fields are obtained, the one or more CPUs may calculate displacement potentials for all possible displacements. Subsequently, the CPUs may use percolation procedures to conduct pore-scale fluid displacements in order from highest to lowest displacement potentials. After a prescribed change in the global saturation of the pore network has been reached, the CPUs may recompute pressure fields and may update the displacement potentials as described above.

According to certain aspects of the present disclosure, one or more CPUs may utilize three possible displacement mechanisms to conduct pore-scale displacements: Piston-like, cooperative pore-body filling, and snap-off.

A "piston-like" displacement refers to the displacement of one phase from the center of an element by another phase residing in the center of an adjoining element.

A "cooperative pore-body filling (PBF)" displacement is a local imbibition event where the non-wetting phase from the center of a pore is displaced by a(n)MTM(s) spanning over the wetting phase in its neighboring throats. For a case where only one of the connecting throats is filled with the non-wetting phase, the event becomes equivalent to a piston-like displacement.

A "snap-off" displacement describes the invasion of the fluid phase residing in the center of a pore element by AMs formed in its corners and rough surfaces. Snap-offs, which occur as a result of AMs swelling due to decrease in local capillary pressure, contribute significantly to the trapping of non-wetting phase during the imbibition processes. The one or more CPUs may allow both spontaneous and forced snap-offs.

Additionally, layer formation and collapse of fluids within pores may be predicted during the fluid flow prediction procedure. Layer formation and collapse pertains to forced imbibition processes where the defending phase can form layers sandwiched between the invading phase residing in the corner and center of pore elements. These layers can subsequently collapse (e.g., get invaded) by the invading phase based on the local capillary pressures.

According to certain aspects, for piston-like displacements the one or more CPUs may calculate the threshold capillary pressure, $$P_c^{th},$$

by minimizing the free energy of fluid configurations within pore elements with angular cross sections. For PBF events, the CPUs may calculate $$P_c^{th}$$

using an empirical correlation. For spontaneous snap-off, the CPUs may determine $$P_c^{th}$$

the capillary pressure at which the AMs will contact each other. For forced snap-off, $$P_c^{th},$$

the CPUs set $$P_c^{th}$$

equal to the capillary pressure at which one of the pinned AMs (i.e., AMs that are unable to move in a stable manner towards the center of the pore element) reaches its advancing contact angle.

According to certain aspects, each pore element within an LCD-PNM may be assigned with an advancing contact angle, $$\theta_{ow}^{adv},$$

for the local imbibition event and a receding contact angle, $$\theta_{ow}^{rec},$$

for the local drainage event. Here, $$\theta_{ow}^{rec}$$

may be smaller than or equal to $$\theta_{ow}^{adv}$$

because of wettability hysteresis. Furthermore to character-ize wettability alteration, different areas of a porous media surface within a pore element a have different sets of advancing and receding contact angles. Specifically, all the pore bodies and pore throats may be initially filled with water and may be strongly water-wet. By the end of primary drainage, the center of pore elements invaded by the non-wetting phase may become less water wet (more oil wet) while the corners, where water layers reside, remain strongly water wet.

Upon the formation of an AM, its initial location and configuration may be uniquely determined by one or more CPUs through a free energy balance analysis. Afterwards, the one or more CPUs may update the AM's configuration based on the local capillary pressure of the pore element. As described in FIG. 6, the AM may stay pinned with a fixed apex-meniscus distance b and a hinging contact angle, $$\theta_{ow}^{hng},$$

which is between $$\theta_{ow}^{rec}$$

and $$\theta_{ow}^{adv}.$$

It may also start to move and change b after the $$\theta_{ow}^{hng}$$

reaches $$\theta_{ow}^{rec}$$

or $$\theta_{ow}^{adv}$$

(see FIG. 6).

In one example, where the porous media sample is an oil-wet porous media, as oil is displaced by water, it can form wetting layers in crevices and sharp corners. The formation of these layers may provide additional pathways for oil to escape the pore space, leading to a smaller residual oil saturation at the end of water flooding. To predict this phenomenon in the LCD-PNM platform, the fluid flow prediction procedure implemented by one or more CPUs may allow for oil layers to form at corners of the invaded pore elements with angular cross-sectional shapes. The prediction occurs, provided that the advancing contact angle satisfies the following geometric and energy balance criteria:

$$\theta_{ow} - \alpha \geq \frac{\pi}{2}$$

$$L_{os}\cos(\pi - \theta_{ow}) \geq L'_{ow} + L''_{ow} + A_{layer}/r_{ow}$$

Here, $\theta_{ow}$ may be the advancing oil/water contact angle, $\alpha$ may be the corner half angle, $A_{layer}$ and, $r_{ow}$ may be the cross-sectional area and the radius of the layer, $L_{os}$ may be the length over which oil is in contact with the pore wall, and $L'_{ow}$ and $L''_{ow}$ may be the lengths of the AMs that sandwich the oil layer. To enforce the energy balance criteria, the location of AMs and hence the pressures of oil and water are needed. Therefore, the calculation of $$P_c^{th}$$

for the piston-like displacement may include an additional loop: after each iteration of computing (converging to) a $$P_c^{th}$$

value, the locations of AMs are updated accordingly, and then the stabilities of the existing oil layers are checked. If a layer is found unstable, it is removed and the next iteration is performed using the new fluid configuration. The loop ends when all the remaining oil layers, are stable under the updated $$P_c^{th}$$

value. Furthermore for every pore element, threshold cap-illary pressure may be computed for each plausible fluid configuration at the end of the piston-like displacement.

In certain implementations of the fluid flow prediction procedure, the threshold capillary pressure of layer collapse may be recalculated for the oil layer after each update of the pressure fields.

In some cases, the hydraulic conductance of fluids within a pore network model may affect pressure fields. Accord-ingly, the conductance may directly affect the pore-scale displacement sequence implemented by one or more CPUs. In some cases, the velocity of a non-wetting fluid may be non-zero at the solid surface making the no-slip boundary condition less valid for small conduits. To capture this, the one or more CPUs may set a slip length, $L_s$, used to account for the non-slip boundary effect. The one or more CPUs may be used to calculate the flow rate, $Q_s$, in a cylindrical tube with radius R:

$$Q_s \approx \pi \frac{R^4}{8\mu}\left(\frac{\Delta p}{L}\right)\left(1 + \frac{4L_s}{R}\right)$$

In some cases, fluid conductivity can be negatively impacted in oil-wet porous media due to the adsorption of crude oil components on the porous media surfaces. This may lead to a reduced cross-sectional area of the pore elements. To capture this, the one or more CPUs may reduce the effective radius of an oil-wet pore element to $R-L_\alpha$, where $L_\alpha$ may be the effective length of oil adsorption. Doing so, the reduced flow rate for oil, $Q_r$, can be expressed by:

$$Q_r = \pi \frac{R^4}{8\mu}\left(\frac{\Delta p}{L}\right)\left(1 - \left(\frac{L_a}{R}\right)^4\right)$$

During water flooding simulations, the oil phase occupying pore elements may lose its connection to the outlet and become trapped since it can no longer be displaced by water. To address this pore trapping, the one or more CPU may evaluate the connectivity of the oil phase each time before listing the volume conservation equations to update the pressure fields.

The LCD-PNM may operate on massively parallel computing architectures to significantly reduce the computation run time. At the start of the fluid flow prediction procedure, the entire pore network may decomposed into a number of subdomains based on the available computational resources. FIG. 7 illustrates example decomposition of the pore network model over 32 processors according to certain aspects of the present disclosure. In certain cases, domain decomposition may be carried out by using a graph partitioning technique implemented in METIS library to achieve optimum workload distribution among the processors and minimum inter-processor communications. In certain cases, to communicate between processors, the one or more CPUs may employ a high-performance MPI.

At the end of the fluid flow prediction procedure, the one or more CPUs may output the results of the procedure. FIG. 8 illustrates example fluid flow flooding produced as an output from an example fluid flow prediction procedure. The first row illustrates an early time step of the fluid flow prediction procedure, where water saturation is at 96%, and oil is the invading phase. The second row illustrates a time step of the fluid flow prediction procedure, where water saturation is at 92%. The third row illustrates a time step of the fluid flow prediction procedure, where water saturation is at 84%. The fourth row illustrates a late iteration of the fluid flow prediction procedure, where water saturation is at 76%.

Implementation of certain aspects of the present disclosure may allow accurate representation of complex interplay among capillary, viscous and gravitational forces during two-phase flow processes within a porous media sample. The fluid flow procedure may reliably model displacement processes under different flow regimes with varying wettability conditions ranging from, for example, strongly water-wet to strongly oil-wet states. Its computational efficiency makes it feasible to perform dynamic pore-scale simulations in large-scale pore networks with similar physical dimensions as core samples used in flow experiments. For example, users such as researchers or engineers, who may develop or use techniques described herein for developing hydrocarbon reservoirs for petroleum production, may obtain a more robust understanding of fluid flow through porous media on the pore-scale level through proper implementation of techniques described herein microscale. The techniques described herein may reduce porous media sample characterization errors to the benefit of all users seeking a more comprehensive understanding of any given porous media

EXAMPLE METHODS

Figure 10:
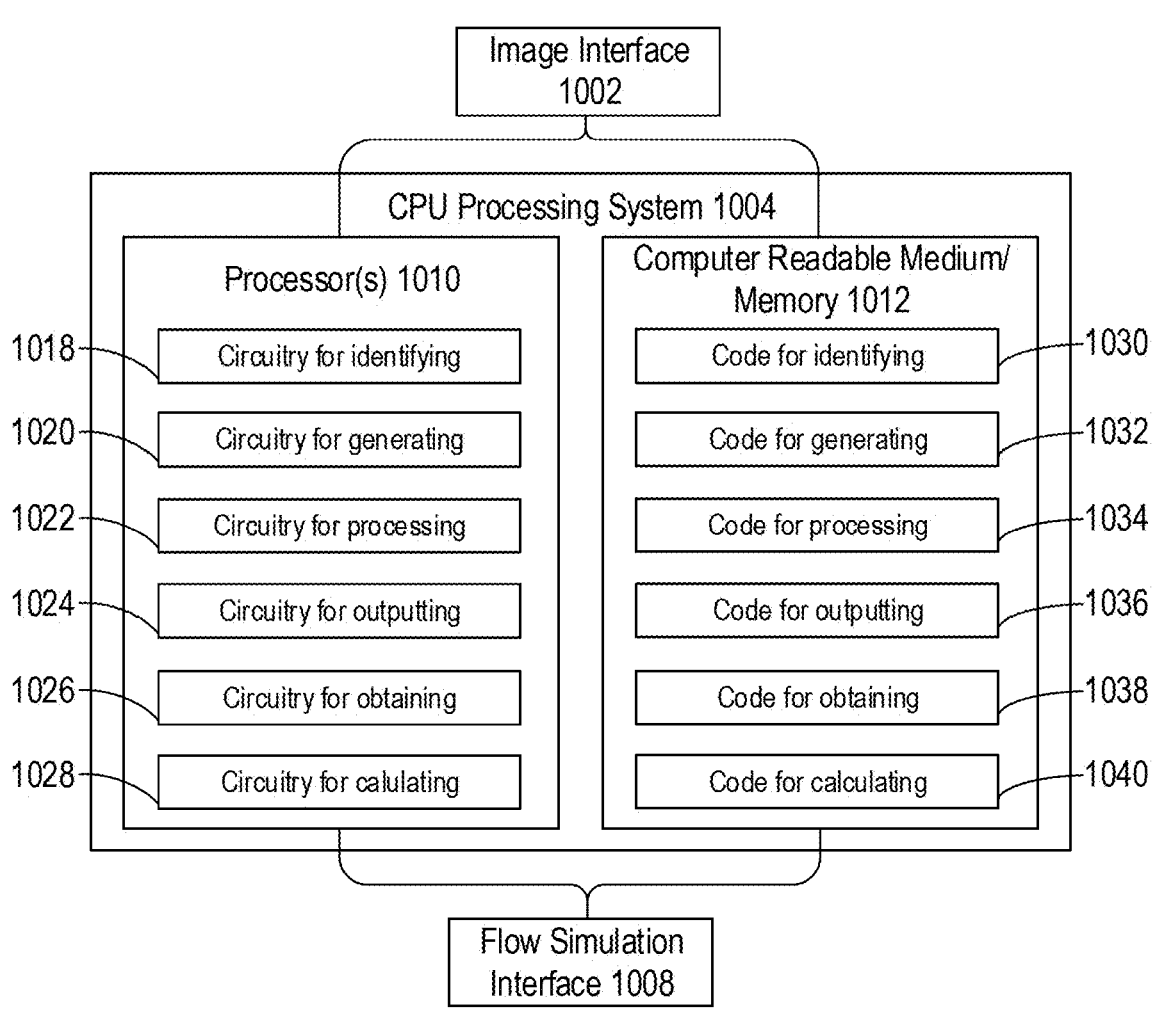
FIG. 10 is an example device for non-destructive characterization of porous media.

FIG. 9 depicts a method 900 for in predicting dynamic two-phase fluid flow in a mixed-wet porous medium by one or more central processing units (CPUs), such as the CPUs of device 1000 of FIG. 10.

Method 900 begins at 902 with one or more CPUs determining a set of possible movements of main terminal menisci (MTMs) within a pore network model (PNM) of a porous media sample having a set of pore elements. In one example, determining the direction of MTM movements comprises determining whether an MTM is present in a pore element. In one example, the pore elements comprise a set of pore bodies and a set of pore throats, wherein both the set of pore bodies and the set of pore throats correspond to physical geometries of the porous media sample. In one example, the porous media sample is a digital rock sample.

Method 900 continues to step 904 with one or more CPUs generating pressure fields for each of the set of movements of MTMs, based on at least an inlet capillary pressure or a set of flow injection boundary conditions. In one example, generating pressure fields for each fluid displacement comprises calculating an outlet capillary pressure, determining a direction of MTM movements, updating the pressure fields, and determining whether the MTM movements are consistent with the updated pressure fields. In one example, updating the pressure fields comprises calculating displacement potentials for all possible MTM movements, determining a local flow rate for each of the all possible MTM movements, and determining pressure fields based on the local flow rate.

Method 900 continues to step 906 with one or more CPUs based on the pressure fields, determining a set of local capillary pressures and a set of arc meniscus (AM) locations.

Method 900 continues to step 908 with one or more CPUs generating a set of fluid displacements potentials based on at least the set of local capillary pressures and a set of threshold capillary pressures. In one example, the set of fluid displacements comprise at least one of a piston-like displacement, a cooperative pore-body filling displacement, a snap-off displacement, and a layer-formation-and-collapse displacement.

Method 900 continues to step 910 with one or more CPUs determining a highest positive fluid displacement potential from the set of fluid displacements. In one example, determining a highest positive fluid displacement potential from the set of fluid displacement potentials comprises determining that there is no available fluid displacement within the PNM.

Method 900 may further include one or more CPUs generating a set of fluid displacements based on the highest positive fluid displacement potential, determining a set of fluid-fluid interface locations and a set of fluid displacement potentials based on the set of fluid displacements, and determining the set of threshold capillary pressures and the set of fluid displacement potentials based on an updated fluid configuration.

Method 900 may further include one or more CPUs determining the highest positive displacement potential from the set of fluid displacements, using percolation algorithms to conduct fluid displacements, or processing invalid assignments of fluid invasion for any of the set of pore elements within the PNM to reverse the invalid assignments,

19 generating at least one of fluid saturation, fluid-fluid interface locations, and phase conductance for each pore element within the PNM, determining an injection volume of an invading phase corresponding to the set of fluid displacements, and determining, based on the set of fluid displacements, that there is no available fluid displacement within the PNM. In one example, generating at least one of fluid saturation, fluid-fluid interface locations, and phase conductance comprises updating a saturation value of each of the pore elements.

Method 900 may further include one or more CPUs outputting results of any set of fluid displacements if a number of flow steps remaining is equal to zero, or determining a new set of fluid displacements if the number of flow steps remaining is greater than zero.

Method 900 may further include one or more CPUs obtaining data for the PNM, determining isolated pore elements within the PNM, processing the PNM to produce a set of decomposed portions of the PNM, determining a set of properties for each of the set of decomposed portions of the PNM, and determining a set of boundary conditions to apply to the set of fluid displacement potentials within the PNM. In one example, the set of boundary conditions comprise a mono-injection of a single fluid phase and a co-injection of two fluid phases at an inlet, wherein the co-injection is based on at least a set of all inlet pore throats and a specified volumetric injection rate of invading and defending phases.

Method 900 may further include one or more CPUs determining local flow rates for each of a set of MTM phase boundaries.

Method 900 may further include one or more CPUs determining a threshold capillary pressure value for each of the MTM movements and the set of fluid displacement potentials.

Method 900 may further include one or more CPUs assigning each pore element an advancing contact angle value and a receding contact angle value.

Method 900 may further include one or more CPUs determining a hydraulic conductivity value for each of the MTM movements.

Method 900 may further include one or more CPU determining phase connectivity of the PNM.

In one aspect, method 900, or any aspect related to it, may be performed by an apparatus, such as fluid flow prediction device 1000 of FIG. 10, which includes various components operable, configured, or adapted to perform the method 900. Device 1000 is described below in further detail.

Note that FIG. 9 is just one example of a method, and other methods including fewer, additional, or alternative steps are possible consistent with this disclosure.

EXAMPLE FLUID FLOW PREDICTION DEVICE

FIG. 10 depicts aspects of a fluid flow prediction device 1000. In some aspects, the device 1000 comprises one or more CPUs as described with respect to at least FIG. 3.

The device 1000 includes a CPU processing system 1004 coupled to an image interface 1002 (e.g., a user interface and/or an image generator). The CPU processing system 1004 may be configured to perform processing functions for the device 1000, including fluid flow prediction in mixed-wet porous media generated by the device 1000.

The CPU processing system 1004 includes one or more processors 1010. The one or more processors 1010 are coupled to a computer-readable medium/memory 1012 via a bus. The one or more processors 1010 and the computer-readable medium/memory 1012 may communicate with each other via a message passing interface (MPI) 1008. In certain aspects, the computer-readable medium/memory 1012 is configured to store instructions (e.g., computer-executable code) that when executed by the one or more processors 1010, cause the one or more processors 1010 to perform the method 900 described with respect to FIG. 9, or any aspect related to it. Note that reference to a processor performing a function of device 1000 may include one or more processors performing that function of device 1000.

In the depicted example, computer-readable medium/memory 1012 stores code (e.g., executable instructions) for determining 1030, code for generating 1032, code for processing 1034, code for outputting 1036, code for obtaining 1038, and code for calculating 1040. Processing of the code 1130-1140 may cause the device 1000 to perform the method 900 described with respect to FIG. 9, or any aspect related to it.

The one or more processors 1010 include circuitry configured to implement (e.g., execute) the code stored in the computer-readable medium/memory 1012, including circuitry for identifying 1018, circuitry for generating 1020, circuitry for processing 1022, circuitry for outputting 1024, circuitry for obtaining 1026, and circuitry for calculating 1028. Processing with circuitry 1018-1028 may cause the device 1000 to perform the method 900 described with respect to FIG. 9, or any aspect related to it.

Various components of the device 1000 may provide means for performing the method 900 described with respect to FIG. 9, or any aspect related to it.

EXAMPLE ASPECTS

Implementation examples are described in the following numbered aspects:

Aspect 1: A method for predicting dynamic two-phase fluid flow in a mixed-wet porous medium by one or more central processing units (CPUs), comprising generating a set of movements of main terminal menisci (MTMs) of a two-phase fluid within a pore network model (PNM) of a porous media sample having a set of pore elements by generating a pressure field for each of the set of movements of MTMs, based on at least an inlet capillary pressure or a set of flow injection boundary conditions; identifying a set of local capillary pressures and a set of arc meniscus (AM) locations based on the pressure field; identifying a set of fluid displacement potentials based on at least the set of local capillary pressures and a set of threshold capillary pressures; identifying a highest positive fluid displacement potential from a set of fluid displacements of the two-phase fluid within the PNM; and performing a set of fluid displacements of the two-phase fluid within the PNM based on the highest positive fluid displacement potential.

Aspect 2: The method of aspect 1, wherein the method further comprises: identifying a set of fluid-fluid interface locations and the set of fluid displacement potentials based on the set of fluid displacements; and identifying the set of threshold capillary pressures and the set of fluid displacement potentials based on the identified set of fluid-fluid locations.

Aspect 3: The method of aspect 2, further comprising: identifying the highest positive displacement potential from the set of fluid displacements; or processing invalid assignments of fluid invasion for any of the set of pore elements within the PNM to reverse the invalid assignments; generating at least one of fluid saturation, fluid-fluid interface locations, and phase conductance for each pore element within the PNM; setting an injection volume of an invading phase corresponding to the set of fluid displacements; and determining, based on the set of fluid displacements, that there is no available fluid displacement within the PNM.

Aspect 4: The method of aspect 3, wherein generating at least one of fluid saturation, fluid-fluid interface locations, and phase conductance comprises updating a saturation value of each of the pore elements.

Aspect 5: The method of any one of aspects 1 through 4, wherein identifying the highest positive fluid displacement potential from the set of fluid displacements comprises determining that there is no available fluid displacement within the PNM.

Aspect 6: The method of any one of aspects 1 through 5, further comprising: outputting results of any set of fluid displacements if a number of flow steps remaining is equal to zero; or generating a new set of fluid displacements if the number of flow steps remaining is greater than zero.

Aspect 7: The method of any one of aspects 1 through 6, further comprising: obtaining data for the PNM; identifying isolated pore elements within the PNM; processing the PNM to produce a set of decomposed portions of the PNM; identifying a set of properties for each of the set of decomposed portions of the PNM; and applying a set of boundary conditions to the set of fluid displacement potentials within the PNM.

Aspect 8: The method of aspect 7, wherein the set of boundary conditions comprise a mono-injection of a single fluid phase and a co-injection of two fluid phases at an inlet, wherein the co-injection is based on at least a set of all inlet pore throats and a specified volumetric injection rate of invading and defending phases.

Aspect 9: The method of any one of aspects 1 through 8, further comprising generating local flow rates for each of a set of MTM phase boundaries.

Aspect 10: The method of any one of aspects 1 through 9, wherein generating pressure fields for each fluid displacement comprises: calculating an outlet capillary pressure; generating a direction of MTM movements; updating the pressure fields; and determining whether the MTM movements are consistent with the updated pressure fields.

Aspect 11: The method of aspect 10, wherein generating the direction of MTM movements comprises determining whether an MTM is present in a pore element.

Aspect 12: The method of any one of aspects 10 through 11, wherein updating the pressure fields comprises: calculating displacement potentials for all possible MTM movements; generating a local flow rate for each of the all possible MTM movements; and generating pressure fields based on the local flow rate.

Aspect 13: The method of any one of aspects 1 through 12, wherein the set of fluid displacements comprise at least one of: a piston-like displacement; a cooperative pore-body filling displacement; a snap-off displacement; and a layer-formation-and-collapse displacement.

Aspect 14: The method of any one of aspects 1 through 13, further comprising generating a threshold capillary pressure value for each of the MTM movements and the set of fluid displacement potentials.

Aspect 15: The method of any one of aspects 1 through 14, further comprising assigning each pore element an advancing contact angle value and a receding contact angle value.

Aspect 16: The method of any one of aspects 1 through 15, further comprising generating a hydraulic conductivity value for each of the MTM movements.

Aspect 17: The method of any one of aspects 1 through 16, further comprising generating phase connectivity of the PNM.

Aspect 18: The method of any one of aspects 1 through 17, wherein the pore elements comprise a set of pore bodies and a set of pore throats, wherein both the set of pore bodies and the set of pore throats correspond to physical geometries of the porous media sample.

Aspect 19: The method of any one of aspects 1 through 18, wherein the porous media sample is a digital rock sample.

Aspect 20: An apparatus, comprising: a memory comprising executable instructions; and a processor configured to execute the executable instructions and cause the apparatus to perform a method in accordance with any one of Aspects 1-19.

Aspect 21: An apparatus, comprising means for performing a method in accordance with any one of Aspects 1-19.

Aspect 22: A non-transitory computer-readable medium comprising executable instructions that, when executed by a processor of an apparatus, cause the apparatus to perform a method in accordance with any one of Aspects 1-19.

Aspect 23: A computer program product embodied on a computer-readable storage medium comprising code for performing a method in accordance with any one of Aspects 1-19.

Additional Considerations

The preceding description is provided to enable any person skilled in the art to practice the various aspects described herein. The examples discussed herein are not limiting of the scope, applicability, or aspects set forth in the claims. Various modifications to these aspects will be readily apparent to those skilled in the art, and the general principles defined herein may be applied to other aspects. For example, changes may be made in the function and arrangement of elements discussed without departing from the scope of the disclosure. Various examples may omit, substitute, or add various procedures or components as appropriate. For instance, the methods described may be performed in an order different from that described, and various actions may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, updating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

The methods disclosed herein comprise one or more operations or actions for achieving the methods. The method operations and/or actions may be interchanged with one another without departing from the scope of the claims. In other words, unless a specific order of operations or actions is specified, the order and/or use of specific operations and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in the Figures, those operations may have corresponding counterpart means-plus-function components with similar numbering.

The following claims are not intended to be limited to the aspects shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for predicting dynamic two-phase fluid flow in a mixed-wet porous medium by one or more central processing units (CPUs), comprising:
   generating a set of movements of main terminal menisci (MTMs) of a two-phase fluid within a pore network model (PNM) of a porous media sample having a set of pore elements by generating a pressure field for movements of MTMs based on at least an inlet capillary pressure or a set of flow injection boundary conditions;
   identifying a set of local capillary pressures and a set of arc meniscus (AM) locations based on the pressure field;
   identifying a set of fluid displacement potentials based on at least the set of local capillary pressures and a set of threshold capillary pressures;
   identifying a highest positive fluid displacement potential from a set of fluid displacements of the two-phase fluid within the PNM; and
   performing a set of fluid displacements of the two-phase fluid within the PNM based on the highest positive fluid displacement potential.

2. The method of claim 1, wherein the method further comprises:

identifying a set of fluid-fluid interface locations and the set of fluid displacement potentials based on the set of fluid displacements; and
identifying the set of threshold capillary pressures and the set of fluid displacement potentials based on the identified set of fluid-fluid interface locations.

3. The method of claim 2, further comprising:
identifying the highest positive displacement potential from the set of fluid displacements; or
processing invalid assignments of fluid invasion for any of the set of pore elements within the PNM to reverse the invalid assignments;
generating at least one of fluid saturation, fluid-fluid interface locations, and phase conductance for each pore element within the PNM;
setting an injection volume of an invading phase corresponding to the set of fluid displacements; and
determining, based on the set of fluid displacements, that there is no available fluid displacement within the PNM.

4. The method of claim 1, wherein identifying the highest positive fluid displacement potential from the set of fluid displacements comprises determining that there is no available fluid displacement within the PNM.

5. The method of claim 1, further comprising:
outputting results of any set of fluid displacements if a number of flow steps remaining is equal to zero; or
generating a new set of fluid displacements if the number of flow steps remaining is greater than zero.

6. The method of claim 1, further comprising:
obtaining data for the PNM;
identifying isolated pore elements within the PNM;
processing the PNM to produce a set of decomposed portions of the PNM;
identifying a set of properties for each of the set of decomposed portions of the PNM; and
applying a set of boundary conditions to the set of fluid displacement potentials within the PNM.

7. The method of claim 6, wherein the set of boundary conditions comprise a mono-injection of a single fluid phase and a co-injection of two fluid phases at an inlet, wherein the co-injection is based on at least a set of all inlet pore throats and a specified volumetric injection rate of invading and defending phases.

8. The method of claim 1, further comprising generating local flow rates for each of a set of MTM phase boundaries.

9. The method of claim 1, wherein generating pressure fields for each fluid displacement comprises:
calculating an outlet capillary pressure;
generating a direction of MTM movements;
updating the pressure fields; and
determining whether the MTM movements are consistent with the updated pressure fields.

10. The method of claim 9, wherein generating the direction of MTM movements comprises determining whether an MTM is present in a pore element.

11. The method of claim 9, wherein updating the pressure fields comprises:
calculating displacement potentials for all possible MTM movements;
generating a local flow rate for each of the all possible MTM movements; and
generating pressure fields based on the local flow rate.

12. The method of claim 1, wherein the set of fluid displacements comprise at least one of:
a piston-like displacement;
a cooperative pore-body filling displacement;

a snap-off displacement; and a layer-formation-and-collapse displacement.

13. The method of claim 1, further comprising generating a threshold capillary pressure value for each of the MTM movements and the set of fluid displacement potentials.

14. The method of claim 1, further comprising assigning each pore element an advancing contact angle value and a receding contact angle value.

15. The method of claim 1, further comprising generating a hydraulic conductivity value for each of the MTM movements.

16. The method of claim 1, further comprising generating phase connectivity of the PNM.

17. The method of claim 1, wherein the pore elements comprise a set of pore bodies and a set of pore throats, wherein both the set of pore bodies and the set of pore throats correspond to physical geometries of the porous media sample.

18. The method of claim 1, wherein the porous media sample is a digital rock sample.

19. An apparatus, comprising: a memory comprising executable instructions, and one or more processors configured to execute the executable instructions and cause the apparatus to:

generate a set of movements of main terminal menisci (MTMs) of a two-phase fluid within a pore network model (PNM) of a porous media sample having a set of pore elements by generating a pressure field for movements of MTMs based on at least an inlet capillary pressure or a set of flow injection boundary conditions;

identify a set of local capillary pressures and a set of arc meniscus (AM) locations based on the pressure field;

identify a set of fluid displacement potentials based on at least the set of local capillary pressures and a set of threshold capillary pressures;

identify a highest positive fluid displacement potential from a set of fluid displacements of the two-phase fluid within the PNM; and perform a set of fluid displacements of the two-phase fluid within the PNM based on the highest positive fluid displacement potential.

20. A non-transitory computer-readable medium comprising executable instructions that, when executed by one or more processors of an apparatus, cause the apparatus to:

generate a set of movements of main terminal menisci (MTMs) of a two-phase fluid within a pore network model (PNM) of a porous media sample having a set of pore elements by generating a pressure field for the movements of MTMs based on at least an inlet capillary pressure or a set of flow injection boundary conditions;

identify a set of local capillary pressures and a set of arc meniscus (AM) locations based on the pressure field;

identify a set of fluid displacement potentials based on at least the set of local capillary pressures and a set of threshold capillary pressures;

identify a highest positive fluid displacement potential from a set of fluid displacements of the two-phase fluid within the PNM; and perform a set of fluid displacements of the two-phase fluid within the PNM based on the highest positive fluid displacement potential.

* * * * *